United States Patent
Nakagawa et al.

(10) Patent No.: US 6,783,158 B2
(45) Date of Patent: Aug. 31, 2004

(54) VEHICLE

(75) Inventors: Mitsuo Nakagawa, Wako (JP); Takashi Ozeki, Wako (JP); Seiichi Kurohori, Wako (JP); Shinji Takayanagi, Wako (JP); Hiroyoshi Kobayashi, Wako (JP); Yoshiyuki Horii, Wako (JP); Takuya Tagami, Wako (JP)

(73) Assignee: Honda Giken Kogyo Kabushiki Kaisha, Minato-ku (JP)

( * ) Notice: Subject to any disclaimer, the term of this patent is extended or adjusted under 35 U.S.C. 154(b) by 45 days.

(21) Appl. No.: 10/129,744

(22) PCT Filed: Sep. 17, 2001

(86) PCT No.: PCT/JP01/08040

§ 371 (c)(1),
(2), (4) Date: Aug. 13, 2002

(87) PCT Pub. No.: WO02/24517

PCT Pub. Date: Mar. 28, 2002

(65) Prior Publication Data

US 2003/0047930 A1 Mar. 13, 2003

(30) Foreign Application Priority Data

Sep. 21, 2000 (JP) ........................................ 2000-287777

(51) Int. Cl.⁷ ............................................. B60R 21/00
(52) U.S. Cl. ..................... 280/785; 180/120; 180/311; 280/279
(58) Field of Search ................................ 280/785, 279; 180/210, 311

(56) References Cited

U.S. PATENT DOCUMENTS

| | | | |
|---|---|---|---|
| 3,866,946 A | | 2/1975 | Robison |
| 4,480,711 A | | 11/1984 | Satoh et al. |
| 4,691,930 A | * | 9/1987 | Samuel ...................... 280/7.1 |
| 4,909,537 A | | 3/1990 | Tratner |

FOREIGN PATENT DOCUMENTS

| | | | |
|---|---|---|---|
| DE | 298 16 144 | | 8/1999 |
| EP | 278479 | * | 8/1988 |
| JP | 1-311974 | * | 12/1989 ................. 180/311 |
| JP | 2515092 | | 6/1991 |
| JP | 11-79044 | | 3/1999 |
| WO | WO 97/16339 | | 5/1997 |

* cited by examiner

Primary Examiner—Eric Culbreh
(74) Attorney, Agent, or Firm—Merchant & Gould, P.C.

(57) ABSTRACT

A vehicle including a body frame (20) commonly used on a two-wheeled automotive vehicle (10), a three-wheeled automotive vehicle (140), and a four-wheeled automotive vehicle (200). A head pipe (23) is formed on a front frame (22) of the body frame. The head pipe has an adjustment mechanism (60) for adjusting a position and an angle of a center line (A1) of a steering shaft (42) relative to a center line (C1) of the head pipe. A rear frame (24) of the body frame has rear walls formed with pluralities of rear mount portions (27) to allow rear units (91, 171, 265) of different kinds for the two-, three- and four-wheeled automotive vehicles to be selectively mounted.

4 Claims, 26 Drawing Sheets

VEHICLE

TECHNICAL FIELD

The present invention relates to a technology which allows a body frame to be used commonly on two-, three- and four-wheeled automotive vehicles.

BACKGROUND ART

Among two-, three- and four-wheeled automotive vehicles, there are some types of vehicles, like a scooter type vehicle, which include a substantially horizontal, low floor type foot rest located at a central and upper area of a body frame. For example, a scooter is type motorcycle is known as a "motorcycle" which is disclosed in Japanese Patent Laid-Open Publication No. HEI-11-79044. Further, Japanese Utility Model Registration No. 2515092 discloses a scooter type motorcycle entitled "A Frame Structure For A Scooter Type Vehicle".

As shown in FIGS. 1 and 4 of the aforementioned Japanese Patent Laid-Open Publication No. HEI-11-79044, the two-wheeled automotive vehicle is the scooter type motorcycle wherein a body frame has a main frame, for supporting a foot rest, which front portion is formed with an upright head pipe post which includes a head pipe by which a steering shaft is rotatably supported to steer a front wheel, and wherein a swing type power unit with rear wheel is mounted to a rear portion of the main frame by means of a bearing and is swingable in an up and down direction.

As shown in FIGS. 1 and 5 of Japanese Utility Model Registration No. 2515092, the scooter type motorcycle has a structure wherein a body frame has a main frame, for supporting a floor portion, which front portion extends upward and has at its distal end formed with a head pipe where front forks are rotatably mounted to steer a front wheel, and wherein a swing type power unit with a rear wheel is mounted to a rear portion of the main frame by means of a link mechanism and is swingable in an up and down direction.

Since the two-, three- and four-wheeled automotive vehicles are different in car models, in general, these vehicles have front-wheel and rear-wheel peripheral components which are different from one another in structure and dimension. For this reason, it is a usual practice to employ particular body frames specific for respective car models of the two-, three- and four-wheeled automotive vehicles.

However, the presence of the particular body frames for each car model needs (1) to prepare particular manufacturing dies and inspection gauges specified for body frames of respective car models with a resultant increase in the production cost of the dies, (2) to shift production lines each time when altering the kind of body frames with a resultant deterioration in productivity and an increase in production-management steps, and (3) to prepare a large number of kinds of body frames with a resultant increase in management steps, storage costs and transportation costs. Due to these factors, when manufacturing the body frames of various kinds, the production cost of the body frames increases and there is yet room for improvement for addressing the above issues.

DISCLOSURE OF THE INVENTION

It is therefore an object of the present invention to reduce the production cost of a body frame for use in two-, three- and four-wheeled automotive vehicles.

According to an aspect of the present invention, there is provided a vehicle which comprises: a body frame having a center frame section for supporting a foot rest, a rear frame section rising upright from a rear portion of the center frame section, and a front frame section rising upright from a front portion of the center frame section; a head pipe formed on the front frame section; and a steering shaft rotatably mounted to the head pipe for steering at least one front wheel, the head pipe having an adjustment mechanism for adjusting a position and an angle of a center line of the steering shaft relative to a center line of the head pipe, the rear frame section having a plurality of rear mount portions for selectively mounting plural kinds of rear units including a swinging power unit equipped with rear wheels and a swing arm equipped with rear wheels.

When using the body frame of one kind commonly on two-, three- and four-wheeled automotive vehicles, adjusting the adjustment mechanism allows the center line of the steering shaft to be adjusted to desired positions and angles relative to the center line of the head pipe so as to cope with the models of the two-, three- and four-wheeled automotive vehicles. As a consequence, even in a case where there is a difference in structure and dimension in peripheral component parts of the front and rear wheels of the two-, three- and four-wheeled automotive vehicles, it is possible to commonly use the body frame.

Desirably, the rear units comprise a rear unit for a two-wheeled automotive vehicle having at least one rear wheel, a rear unit for a three-wheeled automotive vehicle having a pair of right and left rear wheels, and a rear unit for a four-wheeled automotive vehicle having a pair of right and left rear wheels, and wherein the rear mount portions are disposed on a rear wall of the rear frame section in such a manner as to allow the two-wheeled-automotive-vehicle rear unit to be mounted thereto vertically swingably by means of a pivot member, to allow the three-wheeled-automotive-vehicle rear unit to be coupled thereto rollingly and vertically swingably by means of a coupling mechanism, and to allow the four-wheeled-automotive-vehicle rear unit to be coupled to the rear mount portions at least vertically swingably by means of the coupling mechanism, for thereby permitting the two-wheeled-automotive-vehicle rear unit, the three-wheeled-automotive-vehicle rear unit, and the four-wheeled-automotive-vehicle rear unit to be selectively mounted to the rear mount portions.

That is, ① the two-wheeled-automotive-vehicle rear unit, which has a structure and dimension optimum for the two-wheeled automotive vehicle, ② the three-wheeled-automotive-vehicle rear unit, which has a structure and dimension optimum for the three-wheeled automotive vehicle, and ③ the four-wheeled-automotive-vehicle rear unit, which has a structure and dimension optimum for the four-wheeled automotive vehicle, are suitably prepared, and these rear units are selected and detachably mounted to the body frame. while maintaining a commonality of the body frame for the two-, three- and four-wheeled automotive vehicles, it is possible for the body frame to be selectively and readily mounted with the two-wheeled-automotive-vehicle rear unit, the three-wheeled-automotive-vehicle rear unit and the four-wheeled-automotive-vehicle rear unit.

In a preferred form, both side portions of the body frame include pillar mount portions to which a lower portion of a pillar, each of which serves as a roof support post, are detachably mounted. Accordingly, while maintaining a commonality of the body frame for the two-, three- and four-wheeled automotive vehicles, it is possible for the body frame to be readily mounted with various components parts such as a roof, etc., via the pillar.

In a specific form, the vehicle comprises a four-wheeled automotive vehicle which has a pair of right and left rear wheels, and the center frame section and the front frame section have front portions formed with front mount segments to which a front frame is detachably mounted, while the front frame includes arm mount segments for mounting swing arms, which support the pair of right and left front wheels, to be vertically swingable, damper coupling segments for coupling upper distal ends of front dampers by which the swing arms are suspended, and a steering mount segment for rotatably supporting the steering shaft.

Thus, in the present invention, the vehicle is arranged such that the front frame is detachably mounted to the body frame so as to support the steering shaft and, further, the swing arm is mounted to the front frame to which the front dampers are also coupled. Accordingly, while maintaining the commonality of the body frame for the two-, three- and four-wheeled automotive vehicles, it is possible for the front portion of the body frame to be readily mounted with a front suspension system and a steering system of the four-wheeled automotive vehicle.

BRIEF DESCRIPTION OF THE DRAWINGS

Certain preferred embodiments of the present invention will be described in detail below, by way of example only, with reference to the accompanying drawings, in which.

BEST MODE FOR CARRYING OUT THE INVENTION

The following description is merely exemplary in nature and is in no way intended to limit the invention, its application or uses.

Now, a vehicle according to a first preferred embodiment of the present invention is described with reference to an example of a two-wheeled automotive vehicle (automotive two wheeler) shown in FIGS. 1 to 15.

Figure 1:
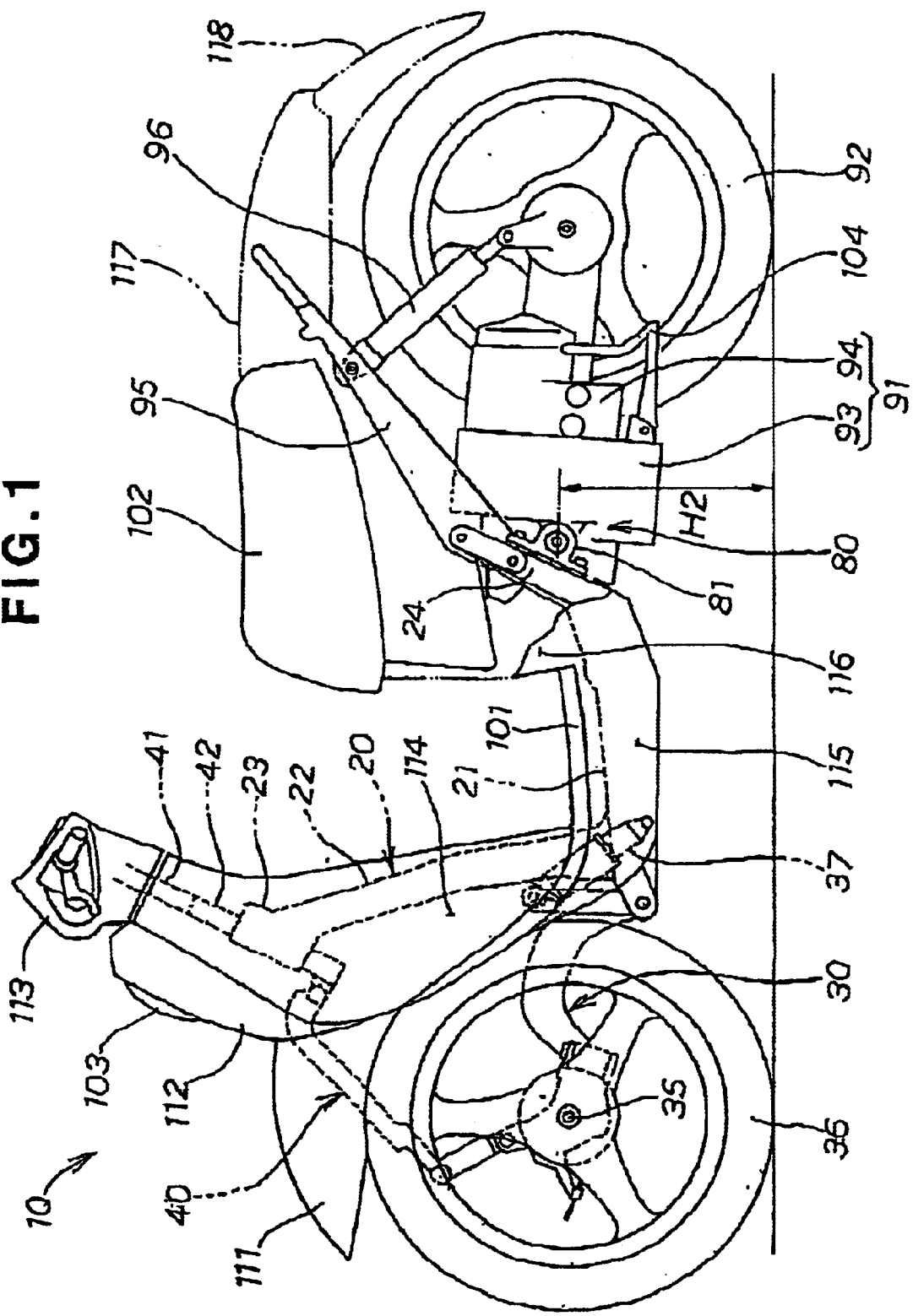
FIG. 1 is a side elevational view illustrating a two-wheeled automotive vehicle (motorcycle) according to a first embodiment of the present invention.

In FIG. 1, the two-wheeled automotive vehicle 10 of the first preferred embodiment is shown as a scooter type motorcycle. The motorcycle 10 includes a front suspension system 30 and a steering system 40 which are mounted to a front portion of a body frame 20. A rear wheel support structure 80 is mounted to a rear portion of the body frame 20. A substantially horizontal, low floor type foot rest (floor step) 101 is mounted to a central and upper portion of the body frame 20. A seat 102 is mounted to a rear and upper portion of the body frame 20. In the drawings, reference numerals 41, 103 and 104 designate a handle lever, a head lamp and a stand, respectively.

The motorcycle 10 has a structure wherein a vehicle body is surrounded with a front fender 111, a front cover 112, a handle cover 113, a leg shield 114 which covers legs of a vehicle driver, a floor skirt 115, a center cover 116, a rear cover 117 and a rear fender 118.

Figure 2:
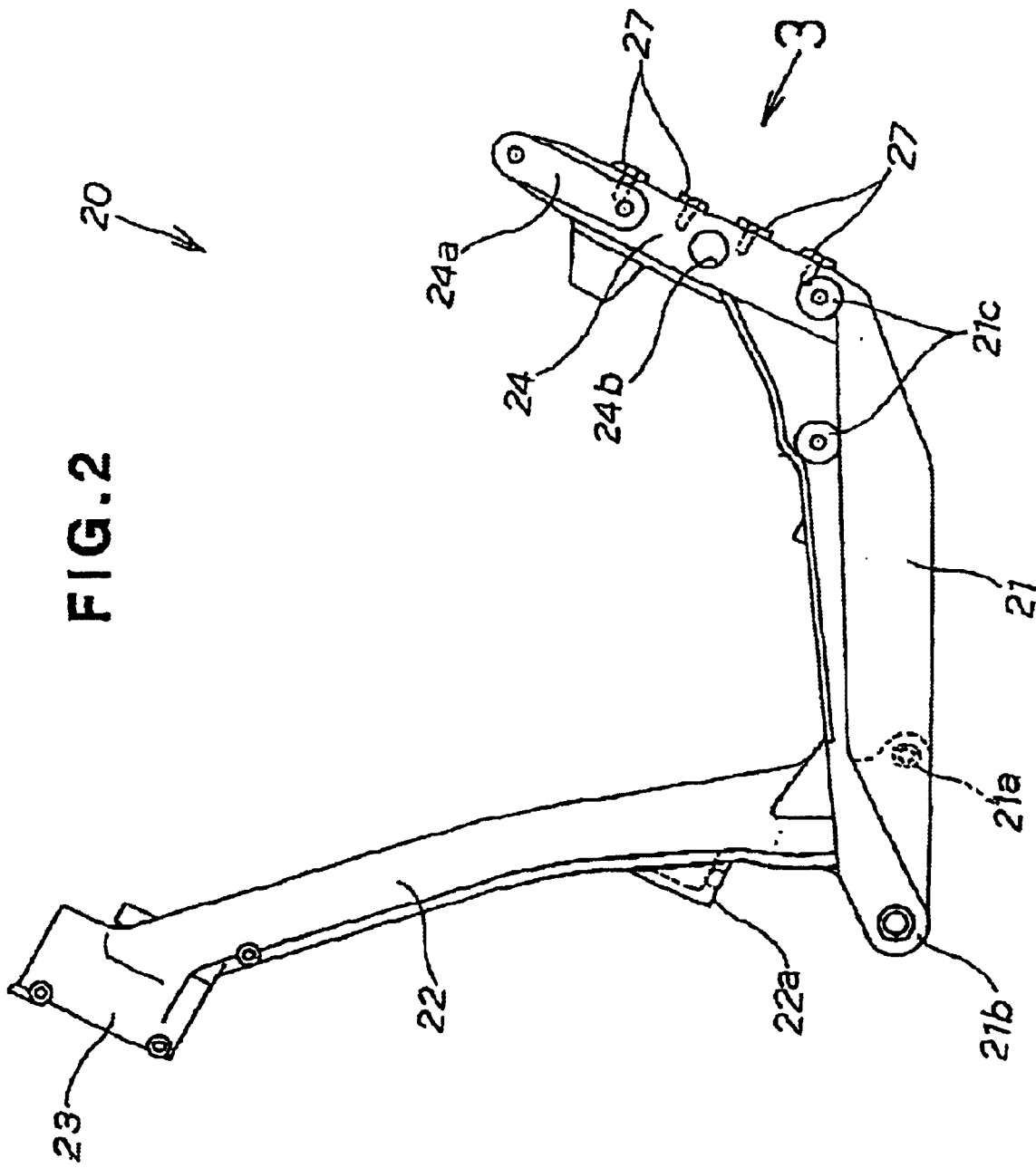
FIG. 2 is an enlarged side view of a body frame shown in FIG. 1.

The body frame 20 shown in FIG. 2 includes a main frame (a center frame section) 21 made of a casting product of aluminum alloy and configured in a substantially horizontally extending frame structure, a head pipe post (a front frame section) 22 standing upright at a front portion of the main frame 21, a head pipe 23 formed at an upper distal end of the head pipe post 22, and a rear upright portion (a rear frame section) 24 standing upright from a rear portion of the main frame 21.

The main frame 21 plays a roll to support the foot rest 101 (see FIG. 1) and has a front area formed with a damper pivot section 21a. The main frame 21 has front mount segments 21b which extend forward at right and left sides of the frame. Pillar mount segments 21c, 21c are formed at a rear portion of the main frame at both right and left sides thereof. The head pipe post 22 has a front and lower area formed with right and left frontal mount segments 22a. The rear upright section 24 has upper right and left side portions formed with rear frame mount segments 24a, and intermediate right and left side portions formed with rear mount segments 24b. The rear mount segments 24b are formed with an axial bore.

Figure 3:
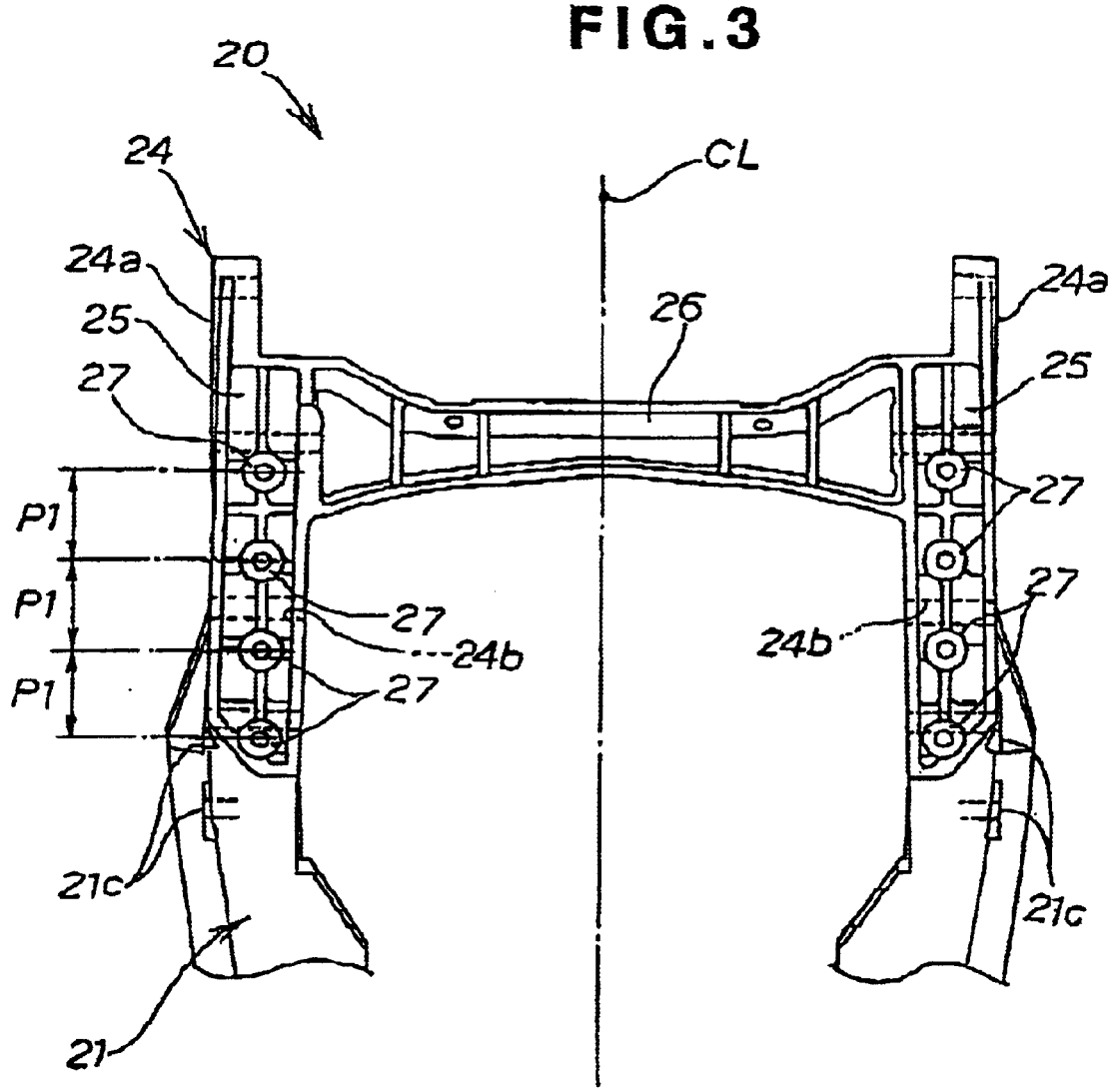
FIG. 3 is a schematic view illustrating the body frame as seen from the direction of numeral 3 shown in FIG. 2.

The rear upright section 24 is composed of a unitary structure formed in a reversed U-shaped configuration as viewed from a backside as shown in FIG. 3, and includes right and left upright sections 25, 25 and a cross member 26 bridged between the upright segments 25, 25 at upper areas thereof. The right and left upright sections 25, 25 are unitarily formed at their rear surfaces with pluralities of rear mount portions 27 in vertically aligned relationships. All of the rear mount portions 27 are equally spaced from one another by a pitch P1. A symbol CL refers to a center (a center of the vehicle body) of a vehicular width.

Figure 4:
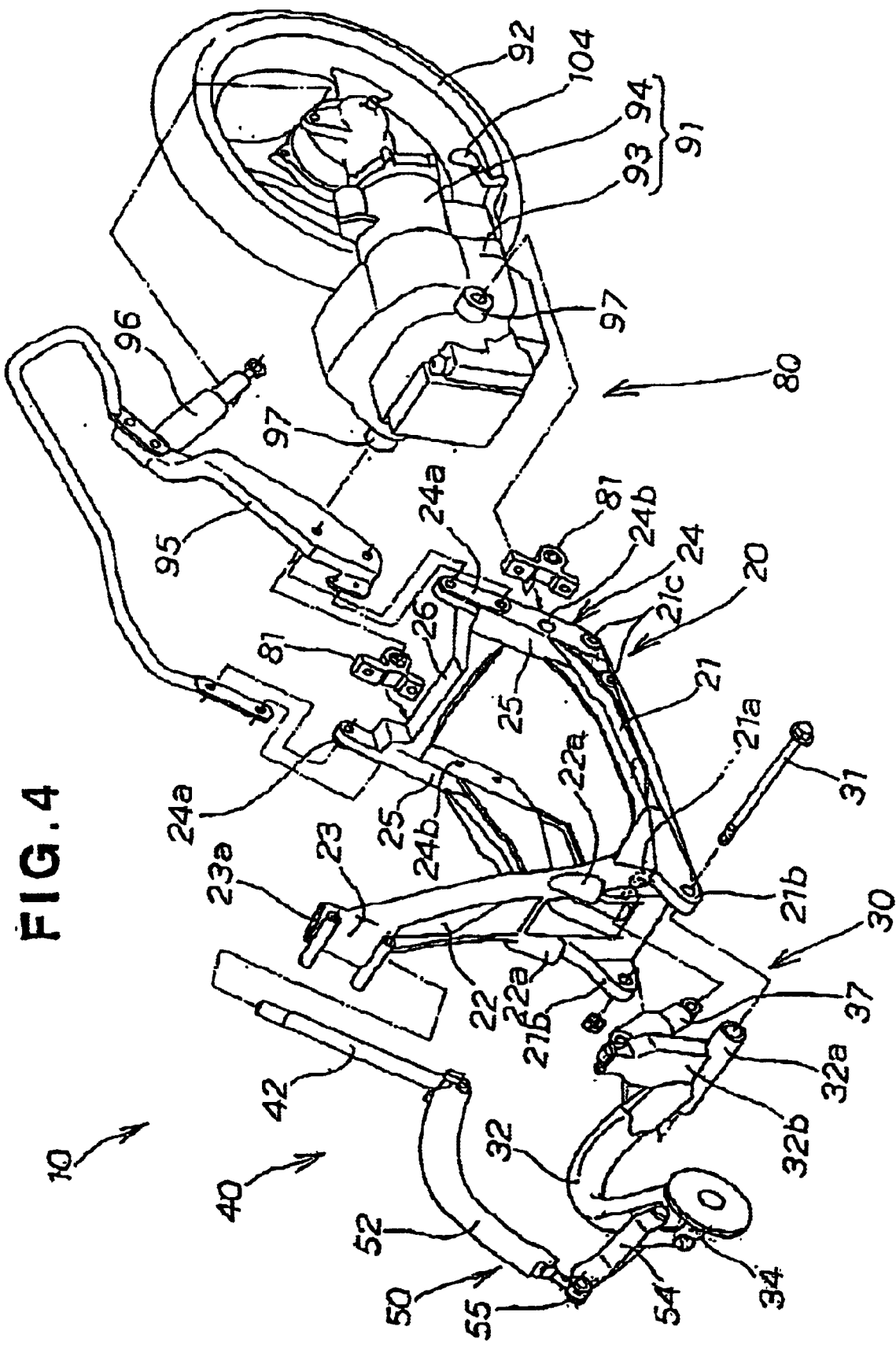
FIG. 4 is an exploded perspective view of the two-wheeled automotive vehicle, with a front wheel omitted.

As shown in FIG. 4, the rear wheel support unit 80 of the motorcycle 10 has a structure wherein pivot members 81, 81 are detachably mounted to the rear parts of the body frame 20 to allow swing type power unit 91 equipped with a rear wheel to be swingably mounted and the rear wheel 92 is rotatably supported at a rear part of the power unit 91.

The power unit 91 includes an engine 93 and a power transmission unit 94 assembled in a unitary fashion therewith to transmit power output of the engine to the rear wheel 92, and serves as a rear unit of the motorcycle including the single rear wheel 92, i.e., a rear drive unit.

The rear upright section 24 has right and left rear frame mount segments 24a, 24a, to which a rear frame 95, formed in a U-shaped configuration as viewed from above in a plane, is fixedly secured by means of bolts. The rear frame 95 serves to suspend a rear portion of the power unit 91 by means of rear dampers 96.

Figure 5:
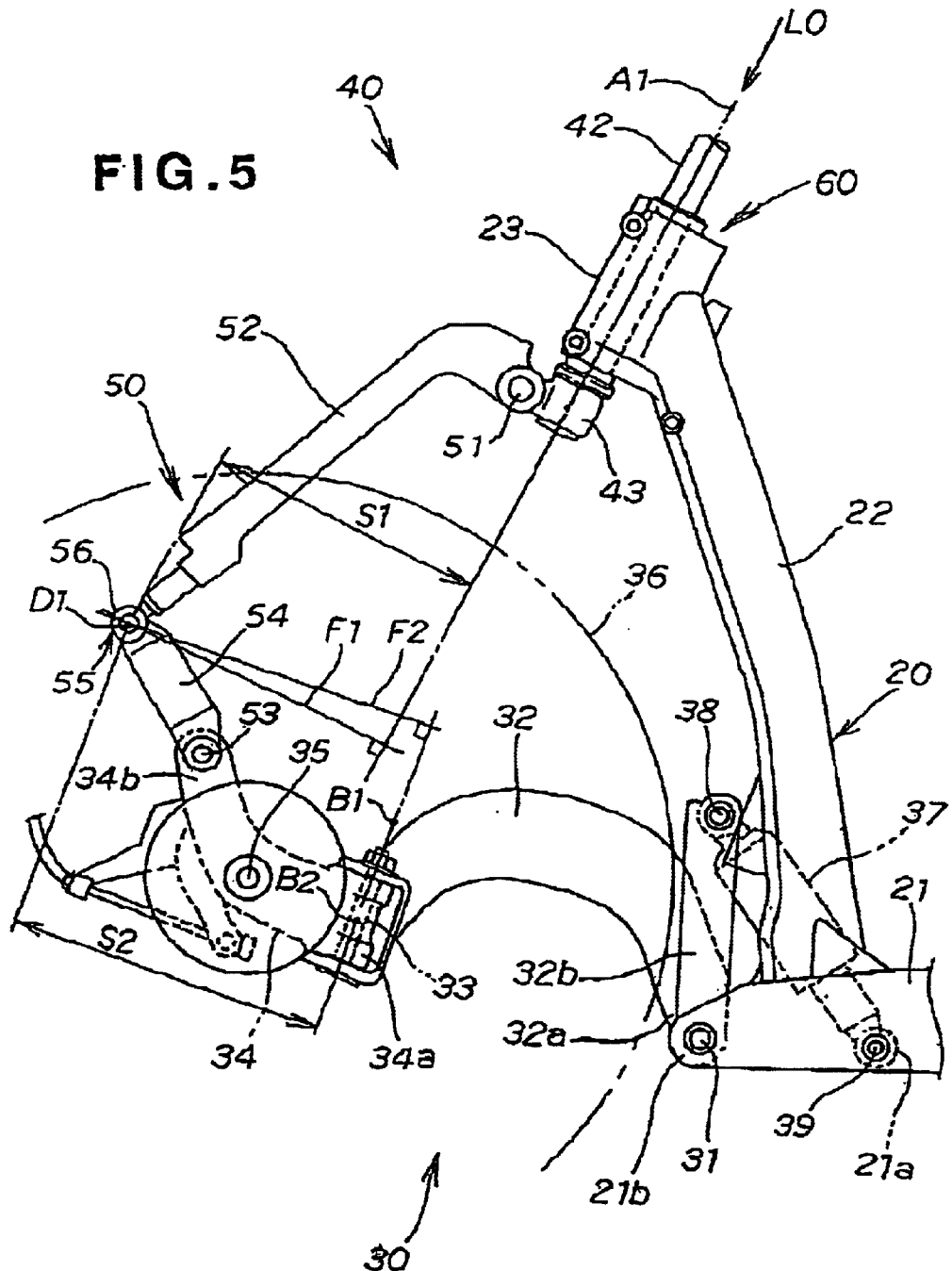
FIG. 5 is a schematic side view illustrating on an enlarged scale a detail of a front suspension system and a steering system of a front portion of the two-wheeled automotive vehicle shown in FIG. 4.

FIG. 5 is a left side view of a front portion of the motorcycle according to the present invention and shows the front suspension system 30 and the steering system 40.

The front suspension system 30 serves as a swing arm type suspension which includes a swing arm 32, formed in a U-shape as viewed from the side, which has a base terminal end 32a mounted to the front mount segments 21b of the main frame 21 by means of a pivot shaft 31 and is swingable upward or downward, and a wheel shaft holder block 34 which is supported with a front end of the swing arm 32 by means of a king pin 33 to be rotatable in a right and left direction, with the wheel shaft holder block 34 being provided with a wheel shaft 35 by which a front wheel 36 is rotatably mounted. That is, the front suspension system 30 includes the swing arm 32 which extends from the front end of the main frame 21 toward a front area of the vehicle body in an upwardly curved shape so as to bypass the front wheel 36 such that the front wheel 36 is supported with the swing arm 32 in a cantilever fashion.

The wheel shaft holder block 34 has a support segment (a king pin mount segment) 34a to allow the king pin 33 to be mounted to a rear and lower portion of the block, a central area in which the wheel shaft 35 is mounted, and a knuckle 34b which extends forward and upward from the wheel shaft 35. The king pin 33 may be unitarily formed with the wheel shaft holder block 34 by means of the support segment 34a.

Further, the front suspension system 30 serves to suspend a base portion of the swing arm 32 to a damper pivot section 21a of the main frame 21 by means of a front damper 37. More particularly, an upright member 32b extends upward from the base terminal end 32a of the swing arm 32 and has its upper distal end to which one distal end of the front damper 32 is interconnected by a pin 38, with the other distal end of the front damper 32 being interconnected to the damper pivot section 21a by a pin 39.

The steering system 40 has a structure with the following features (1) and (2).

(1) A steering shaft 42 is rotatably supported by the head pipe 23 and has a lower distal end formed with a connecting member 43 which in turn is connected to the knuckle 34b via a link mechanism so.

(2) The head pipe 23 includes an adjustment mechanism 60 which is enabled to shift a center line A1 of the steering shaft 42 relative to a center line of the head pipe 23.

In particular, the steering system 40 is so arranged that one end of the link mechanism 50 is connected to the knuckle 34b of the wheel shaft holder block 34 and the other end of the link mechanism 50 is connected to the steering shaft 42 to allow the steering shaft 42 to steer the front wheel 36.

The link mechanism 50 is constructed of a crooked link, which is configured in a dog leg shape to be freely bendable to accept upward or downward movements of the front wheel 36, and which includes first and second links 52, 54 between which a connecting segment 55 is directed forward.

More particularly, the link mechanism 50 includes (1) a first link 52 having its one end which is connected to the connecting member 43 of the steering shaft 42 by means of a first connecting pin 51 and is swingable vertically, (2) a second link 54 having is its one end which is connected to a distal end of the knuckle 34b by means of a second connecting pin 53 and is swingable vertically, and (3) a universal joint coupling 56 which is connected to the other ends of the first and second links 52, 54, i.e., to the connecting segment 55, between the first and second links 52, 54, which is swingable upward or downward. The universal joint coupling 56 is composed of, for example, a ball joint.

With such a steering system 40, the king pin 33 is located at a position offset in a rearward direction from the steering shaft 42 and, when looking at the link mechanism 50 from above, the steering shaft 42 remains in an intermediate position between the king pin 33 and the universal joint coupling 56. More particularly, when looking at the link mechanism 50 from the center line A1 of the steering shaft 42, i.e., in a direction of line LO, the steering system 40 has the following relationship (1) to (3).

(1) A connecting center B2 between the front end of the swing arm 32 and the king pin 33 is located at a position offset rearward from the center line A1 of the steering shaft 42.

(2) A center D1 of the universal joint coupling 56 is located at a position offset forward by an offset quantity S1 from the center line A1 of the steering shaft 42.

(3) The center line B1 of the king pin B1 and the center D1 of the universal joint coupling 56 is spaced by a distance S2.

Thus, it is possible for the connecting center B2 or the center D1 of the universal joint coupling 56 to be offset rearward or forward relative to the center line A1 of the steering shaft 42.

As the front wheel 36 moves upward or downward, the swing arm 32 and the wheel shaft holder block 34 swing upward or downward according to the displacement value of the front wheel. As a consequence, the second link 54, connected to the knuckle 34b, and the first link 52 are caused to swing upward or downward.

Figure 6:
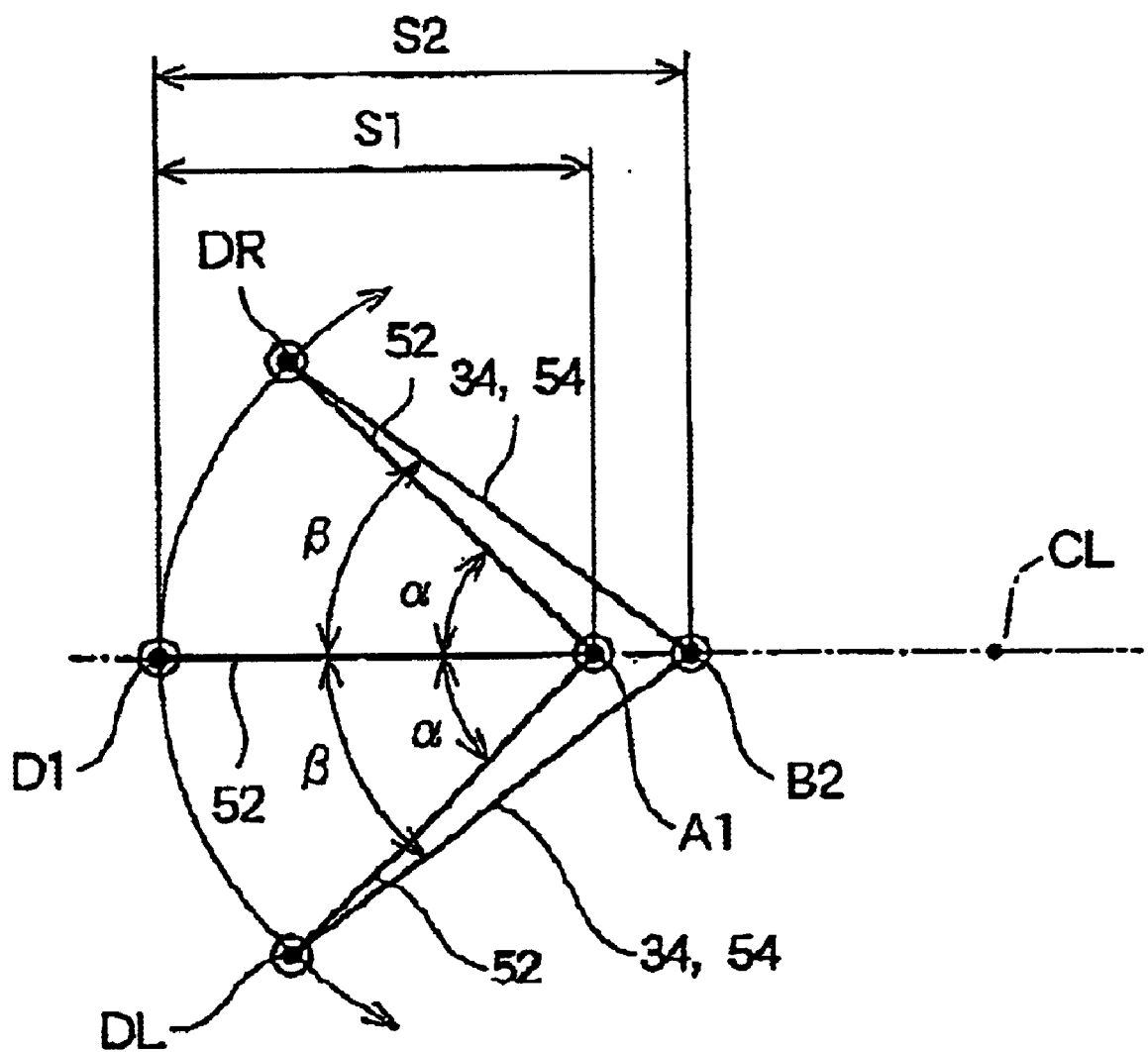
FIG. 6 is a schematic view illustrating an operation of the front suspension system and the steering system shown in FIG. 5.

FIG. 6 is a view for illustrating the operation of the front suspension system and the steering system shown in FIG. 5 and shows a typical operational view when looking at the front suspension system 30 and the steering system 40, shown in FIG. 5, from the line LO.

However, the connecting center B2 is illustrated in a developed state on a flat surface F1 perpendicular to the center line A1 of the steering shaft 42 and intersecting the center D1 of the universal joint coupling 56 shown in FIG. 5. That is, when assuming that the flat surface perpendicular to the center line B1 of the king pin 33 and intersecting the center D1 of the universal joint coupling 56 is expressed as F2, the flat surface F2 is illustrated in a developed state so as to overlap the aforementioned flat surface F1. When developed as such, the center line A1 of the steering shaft 42 is parallel to the center line B1 of the king pin 33.

In FIG. 6, the center line A1 of the steering shaft 42, the connecting center B2 between the front end of the swing arm 32 and the kingpin 33, and the center D1 of the universal joint coupling 56, shown in FIG. 5, refer to a "point A1", a "point B2" and a "point D1", respectively.

Now, the front suspension system 30 and the steering system 40 are described below in detail in conjunction with FIGS. 5 and 6.

When a manipulating angle of the steering shaft 42 remains at a zero degree, that is, when the steering shaft remains in a neutral position, the points A1, B2 and D1 are aligned on the center line CL of the vehicle body. From such a neutral position, if the first link 52 is manipulated rightward with the steering shaft 42 by a manipulating angle α with respect to a forward portion of the vehicle, then the point D1 is displaced to a point DR. As a result, the wheel shaft holder block 34 and the second link 54 are steered by a steering angle of β about the point B2. On the contrary, if the first link 52 is manipulated leftward, similarly, the point D1 is displaced to a point DL. As a result, the wheel shaft holder block 34 and the second link 54 are steered leftward.

Since the point B2 is offset rearward with respect to the point A1, the steering angle β is smaller than the manipulating angle a (i.e., α>β). Thus, the steering power of the steering shaft 42 becomes smaller in value than that attained in a case where there is no aforementioned offset condition. Adjusting the amount of offset enables the rate of the steering angle β relative to the manipulating angle a to be varied.

Also, in a case where the point B2 is offset forward with respect to the point A1, the steering angle β becomes larger than the manipulating angle a (i.e., α<β). Thus, the steering power of the steering shaft 42 becomes larger in value than that attained in a case where there is no aforementioned offset condition.

Figure 7:
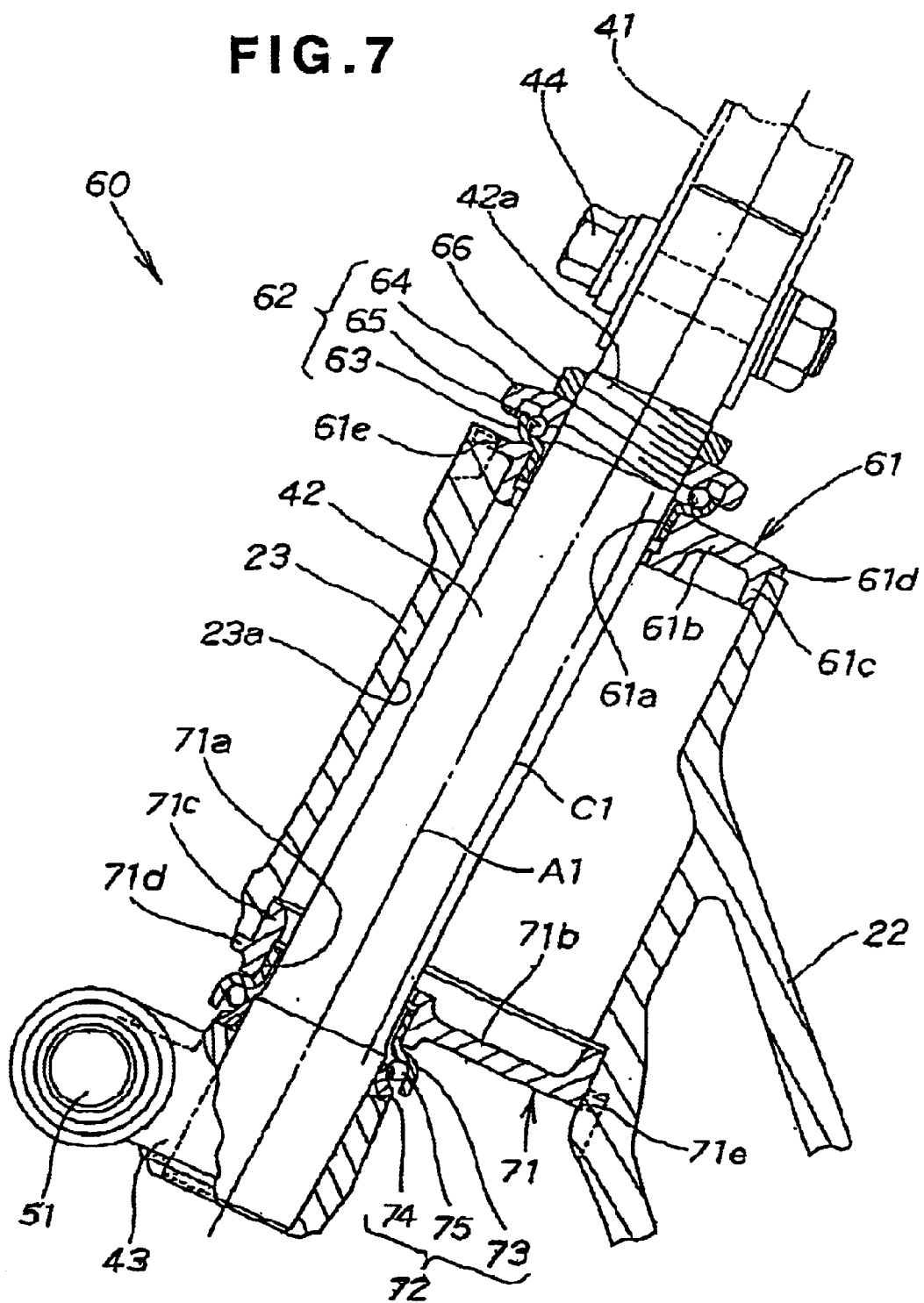
FIG. 7 is a cross-sectional view of an adjustment mechanism of a steering shaft shown in FIG. 5.

FIG. 7 is a cross sectional view illustrating peripheries of the steering shaft and the adjustment mechanism.

The head pipe 23 has a through-hole 23a, which extends upward and downward, for receiving the steering shaft 42.

The through-hole 23a has a diameter relatively larger than that of the steering shaft 42 so as to allow the center line A1 of the steering shaft 42 to intersect the center line C1 of the head pipe 23 at an arbitrary angle. For example, the through-hole 23a may be formed in an elliptic-shaped hole which is elongated in a fore and aft direction as compared to the diameter of the steering shaft 42, or in a large sized hole with a true circle. The steering shaft 42 and the connecting member 43 are coupled to one another by press fitting the steering shaft 42 to the connecting member 43 and subsequently welding lower end portions.

The adjustment mechanism 60 is so constructed that a top plate 61 and a bottom plate 71 are mounted to upper and bottom walls of the head pipe 23 to be replaceable and the steering shaft 42 is inserted through and rotatably supported by a through-bore 61a of the top plate 61 and a through-bore 71a of the bottom plate 71. The top plate 61 serves to support the steering shaft 42 by means of a first bearing 62 and a lock nut 66. Likewise, the bottom plate 71 serves to support the steering shaft 42 by means of a second bearing 72.

In particular, the top plate 61 includes a body unit 61b formed with the through-bore 61a, an engaging portion 61c which engages the through-hole 23a of the head pipe 23, a flange 61d held in abutting engagement with an upper distal end of the head pipe 23, and a positioning recess 61e which engages a convex portion of the head pipe 23 for positioning.

The first bearing 62 includes an outer race 63 which engages the through-bore 61a of the top plate 61, an inner race 64 which is screwed on to a male thread 42a of the steering shaft 42, a plurality of balls 65 interposed between the outer and inner races 63, 64, and a retainer, which is not shown, for retaining the balls 65. The inner race 64 plays a roll of an adjustment nut.

The bottom plate 71 includes a body unit 71b formed with the through-bore 71a, an engaging portion 71c which engages the through-hole 23a of the head pipe 23, a flange 71d held in abutting engagement with a lower distal end of the head pipe 23, and a positioning recess 71e which engages a convex portion of the head pipe 23 for positioning.

The second bearing 72 includes an outer race 73 which engages the through-bore 71a of the bottom plate 71, an inner race 74 which is fitted to the steering shaft 42, a plurality of balls 75 interposed between the outer and inner races 73, 74, and a retainer, which is not shown, for retaining the balls 75.

As will be apparent from the foregoing description, it is possible for the steering shaft 42 to be rotatably mounted in the head pipe 23 by means of the top and bottom plates 61, 71 and the first and second bearings 62, 72. Reference numeral 44 designates a fixture bolt for fixing a handle bar 41 to an upper end of the steering shaft 42.

FIG. 7 shows that the center line A1 of the steering shaft 42 is substantially parallel to and is located forward of the center line C1 of the head pipe 23. As a matter of course, the centers of the through-bores 61a, 71a of the top and bottom plates 61, 71, which are mounted to the top and bottom walls of the head pipe 23, are aligned with the center line A1 of the steering shaft 42.

Figure 8:
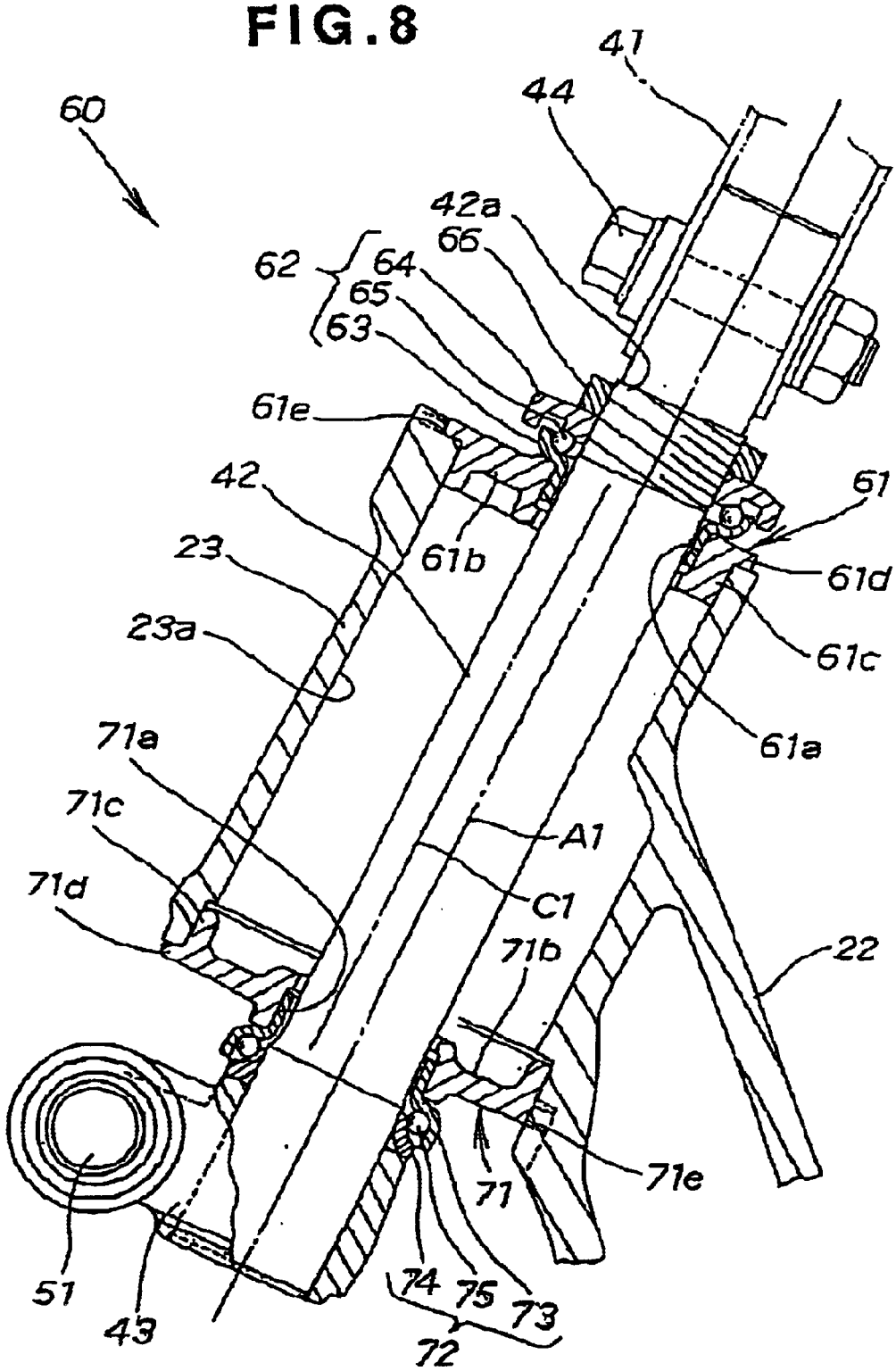
FIG. 8 is a cross-sectional view illustrating an example wherein the steering shaft is mounted to a head pipe such that a center of the steering shaft is located rearward of a center of the head pipe in FIG. 7.

FIG. 8 shows an example wherein the steering shaft 42 is mounted to the head pipe 23 such that the center line A1 of the steering shaft 42 is located in parallel to and rearward of the center line C1 of the head pipe 23.

The centers of the through-bores 61a, 71a of the top and bottom plates 61, 71, which are mounted to the top and bottom walls of the head pipe 23, coincide with the center line A1 of the steering shaft 42. Replacement of the top and bottom plates 61, 71 shown in FIG. 7 with the top and bottom plates 61, 71 shown in FIG. 8 allows the center line A1 of the steering shaft 42 to be shifted.

Figure 9:
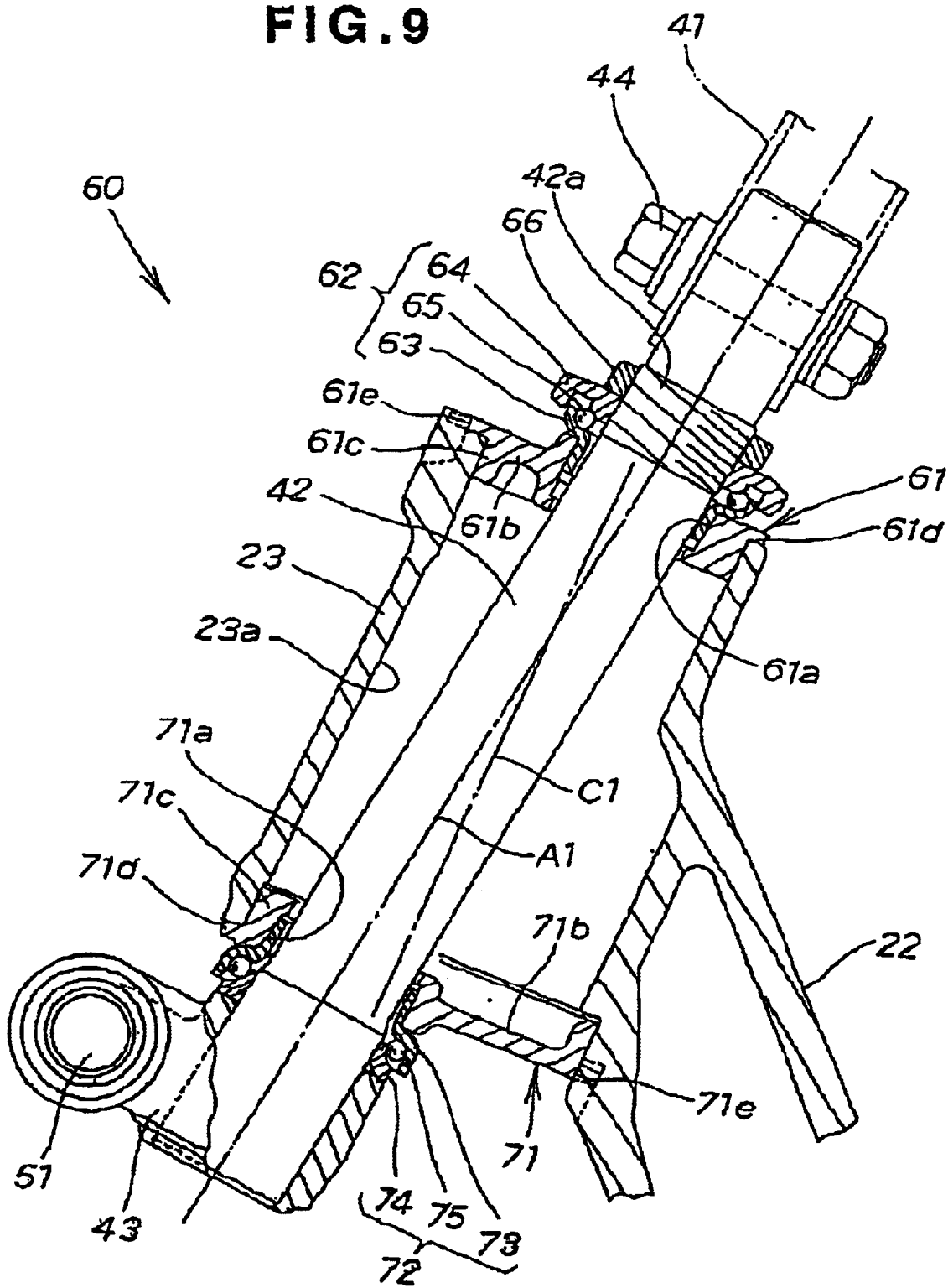
FIG. 9 is a cross-sectional view illustrating an example wherein the steering shaft is mounted to and is inclined with respect to the head pipe such that a lower distal end of the steering shaft is directed rearward in FIG. 7.

FIG. 9 shows an example wherein the steering shaft 42 is mounted to the head pipe 23 such that the center line A1 of the steering shaft 42 is arranged to intersect at a forward area with the center line C1 of the head pipe 23 by locating a lower end of the steering shaft 42 at a more forward place than the center line C1 of the head pipe 23.

The centers of the through-bores 61a, 71a of the top and bottom plates 61, 71, which are mounted to the top and bottom walls of the head pipe 23, coincide with the center line A1 of the steering shaft 42. Replacement of the top and bottom plates 61, 71 shown in FIG. 7 with the top and bottom plates 61, 71 shown in FIG. 9 allows the center line A1 of the steering shaft 42 to be shifted.

Figure 10:
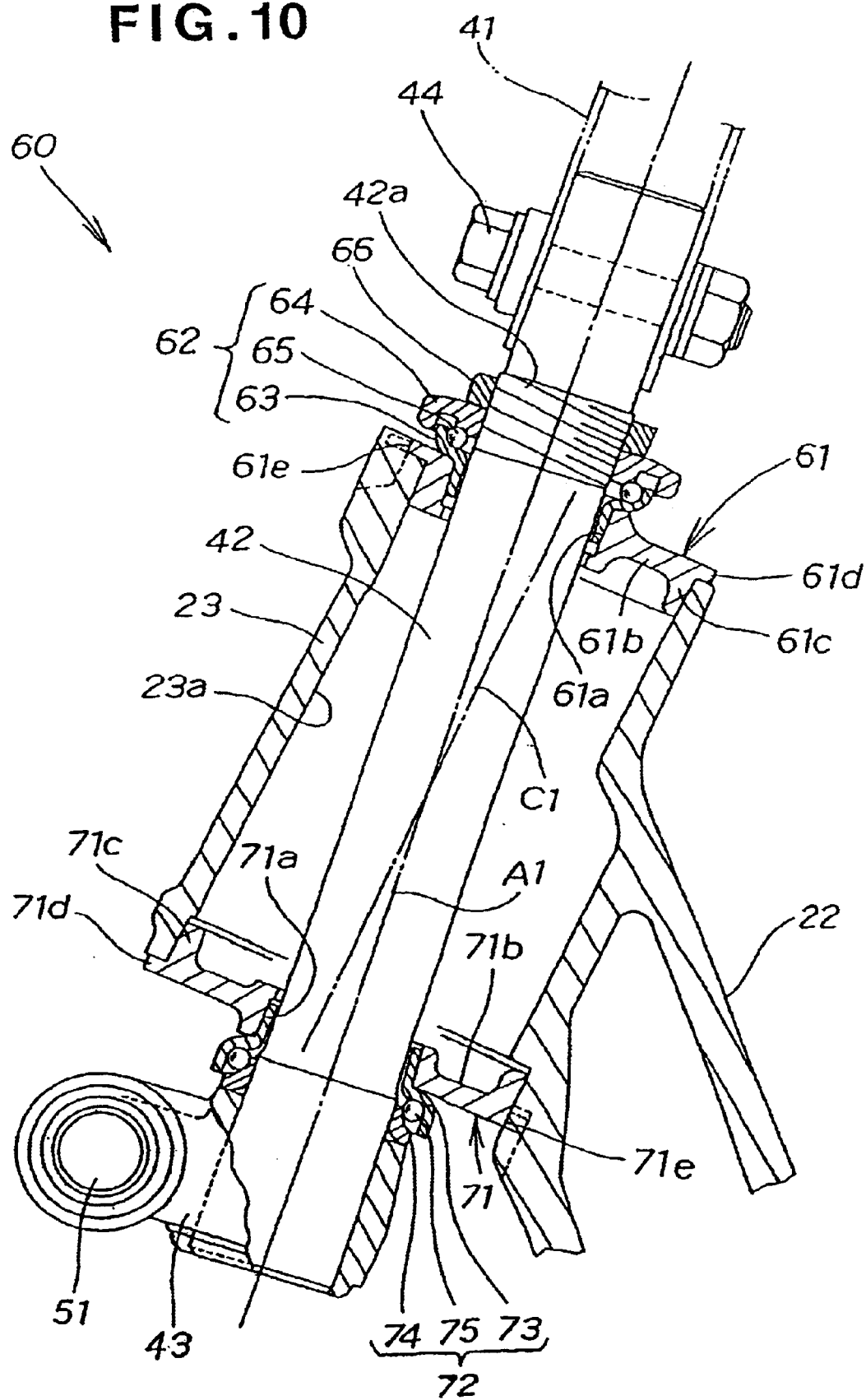
FIG. 10 is a cross-sectional view illustrating an example wherein the lower distal end of the steering shaft is mounted to and is inclined with respect to the head pipe in FIG. 9.

FIG. 10 shows an example wherein the steering shaft 42 is mounted to the head pipe 23 such that the center line A1 of the steering shaft 42 is arranged to intersect at a rearward area with the center line C1 of the head pipe 23 by locating a lower end of the steering shaft 42 at a more rearward place than the center line C1 of the head pipe 23.

The centers of the through-bores 61a, 71a of the top and bottom plates 61, 71, which are mounted to the top and bottom walls of the head pipe 23, coincide with the center line A1 of the steering shaft 42. Replacement of the top and bottom plates 61, 71 shown in FIG. 7 with the top and bottom plates 61, 71 shown in FIG. 10 allows the center line A1 of the steering shaft 42 to be shifted.

As will be apparent from the foregoing description, by replacing the plural top plates 61 and the plural bottom plates with the other ones according to the diameter of the front wheel 36 (see FIG. 5), it is possible for the center line A1 to be altered to an arbitrary position or at an arbitrary angle with respect to the center line C1 of the head pipe 23. Changing the position or the angle of the center line A1 alters the offset quantities S1, S2 shown in FIGS. 5 and 6, thereby enabling the rate of the steering angle β relative to the manipulation angle α to be settled to an optimum level.

Figure 11:
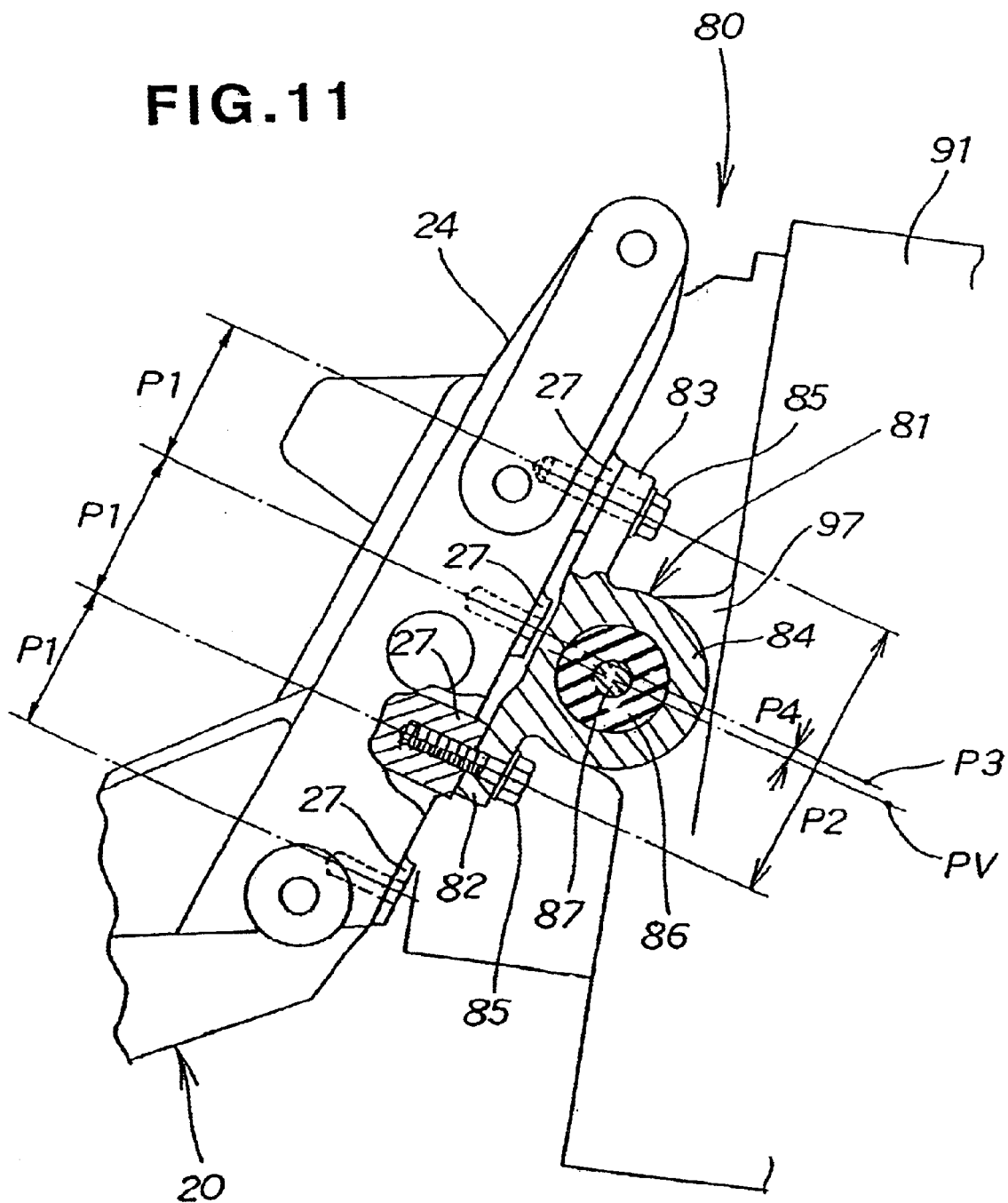
FIG. 11 is an enlarged view showing, partially in section, a rear wheel support unit shown in FIGS. 1 and 4.
Figure 12:
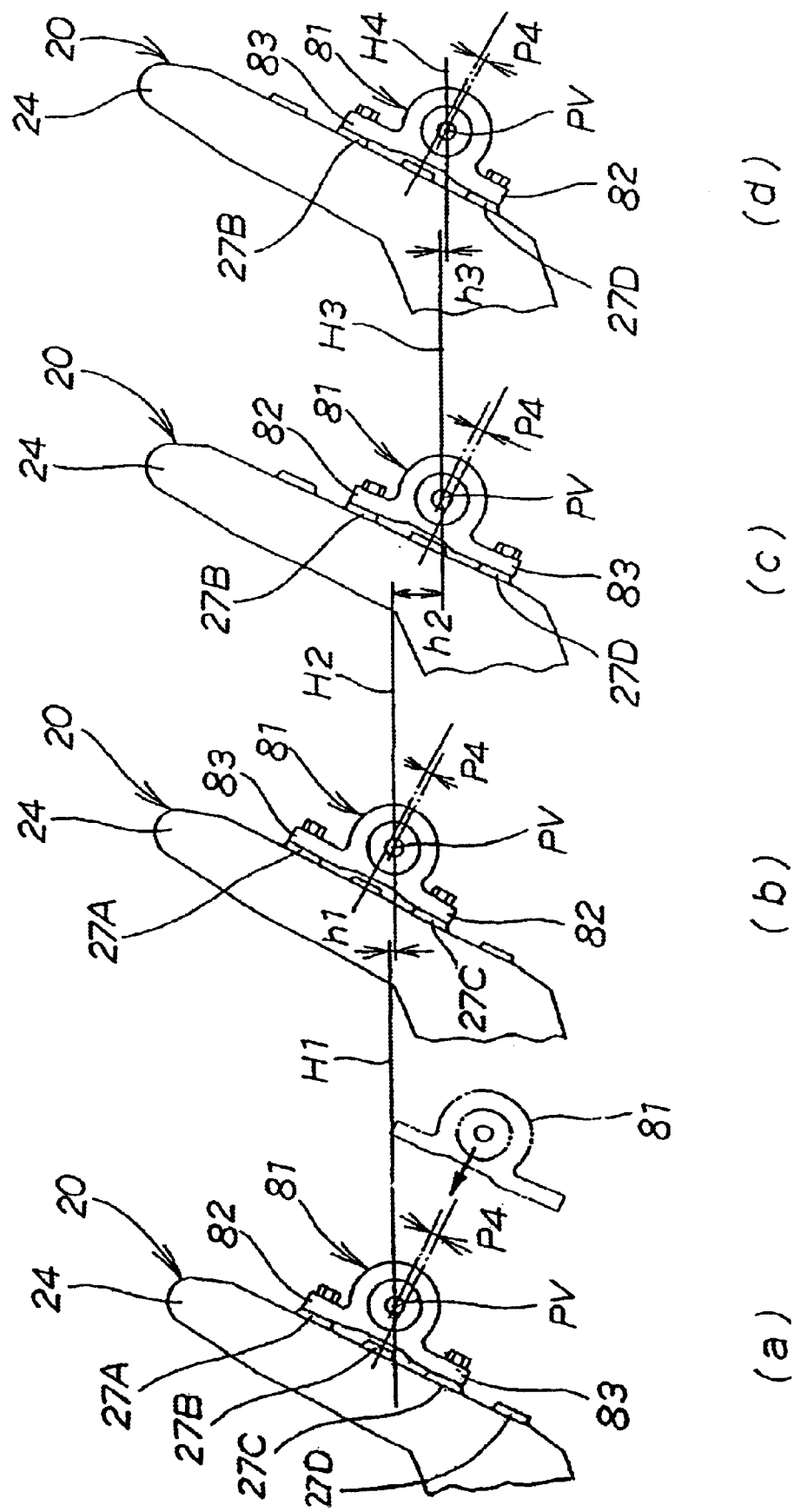
FIG. 12 is a view illustrating steps for mounting a pivot member of the rear wheel support unit shown in FIG. 11 to the rear frame of the body frame.

FIG. 11 is an enlarged view for illustrating a detail of the rear wheel support unit 80.

The rear wheel support unit 80 features a structure wherein the body frame 20 is formed with a plurality (i.e., four pieces in an illustrated embodiment of FIG. 11) of the rear mount portions 27 to allow the mounting height of the pivot member 81 to be arbitrarily adjusted. Further, the rear wheel support unit 80 features that, by turning upside down the pivot member 81, the height position of the pivot point PV is enabled to be altered.

The pivot member 81 is composed of a unitary product which includes first and second coupling segments 82, 83 and a pivot segment 84 integral with the first and second coupling segments 82, 83. The pivot segment 84 is located rearward of the first and second coupling segments 82, 83.

The first and second coupling segments 82, 83 are spaced from one another by a pitch P2 which corresponds to the pitch between upper and lower bolt apertures and is equal to a value two times (P2=2×P1) the pitch P1 between the rear mount portions 27, 27. The point P3, which remains at an intermediate height between the first and second coupling segments 82, 83, lies in a position at a value ½ the pitch P2.

Mounting the first and second coupling segments 82, 83 to the arbitrary ones of the rear mount portions 27, 27 by means of bolts 85, 85 enables the pivot member 81 to be coupled to the rear wall of the body frame 20.

The pivot segment 84 allows hanger segments 97 of the power unit 91 to be mounted in an upward and downward swinging relationship with the pivot shaft 87 via a rubber bush 86. Here, the center (i.e., the center of the pivot segment 84) of the pivot shaft 87 refers to a pivot point PV. The pivot member 81 lies in a position closer to the first coupling segment 82 by a dimension P4, i.e., lies in the pivot point PV remaining at the offset position.

FIGS. 12(a) to (d) are views for illustrating the operation of altering the height position of the pivot point PV shown in FIG. 11. In these drawings, further, the four pieces of rear mount portions 27 involve, in a sequence from the above, a first rear mount segment 27A, a second rear mount segment 27B, a third rear mount segment 27C, and a fourth rear mount segment 27D.

FIG. 12(a) shows a situation wherein the pivot member 81 is brought into engagement with the body frame 20 from a rearward area and the first coupling segment 82 is mounted to the first rear mount portion 27A while the second coupling segment 83 is coupled to the third rear mount portion 27C. The pivot point PV remains at a height H1.

FIG. 12(b) shows a situation wherein the pivot member 81 is turned upside down from the position shown in FIG. 12(a) and the height of the pivot point PV is altered. In this instance, the second coupling segment 83 is mounted to the first rear mount portion 27A, and the first coupling segment 82 is mounted to the third rear mount portion 27C. The pivot point PV lies at a height H2 which is lower than the height H1 by a height h1.

FIG. 12(c) shows a situation wherein the pivot member 81 is aligned in the same direction as FIG. 12(a) and the first coupling segment 82 is mounted to the second rear mount portion 27B while the second coupling segment 83 is mounted to the fourth rear mount portion 27D. The pivot point PV lies at a height H3 which is higher than the height H2 by a height h2.

FIG. 12(d) shows a situation wherein the pivot member 81 is turned upside down from the position shown in FIG. 12(c) and the height of the pivot point PV is altered. In this instance, the second coupling segment 83 is mounted to the first rear mount portion 27B, and the first coupling segment 82 is mounted to the fourth rear mount portion 27D. The pivot point PV lies at a height H4 which is lower than the height H3 by a height h3.

As is apparent from the foregoing description, the presence of the plurality of rear mount portions 27 aligned vertically on the body frame 20 allows the first and second coupling segments 82, 83 to be selectively and detachably mounted onto the rear mount portions 27, thereby enabling the mounting height of the pivot member 81 to be arbitrarily adjusted. As a result, the mounting height of the power unit 91 (see FIG. 11) maybe arbitrarily adjusted to a desired value.

Further, the presence of the pivot member 81 adapted to be turned upside down to be mounted to the rear mount portions 27, allows the height position of the pivot point PV to be altered. As a result, the height position of the power unit 91 (see FIG. 11) may be arbitrarily altered to a desired value.

Figure 13:
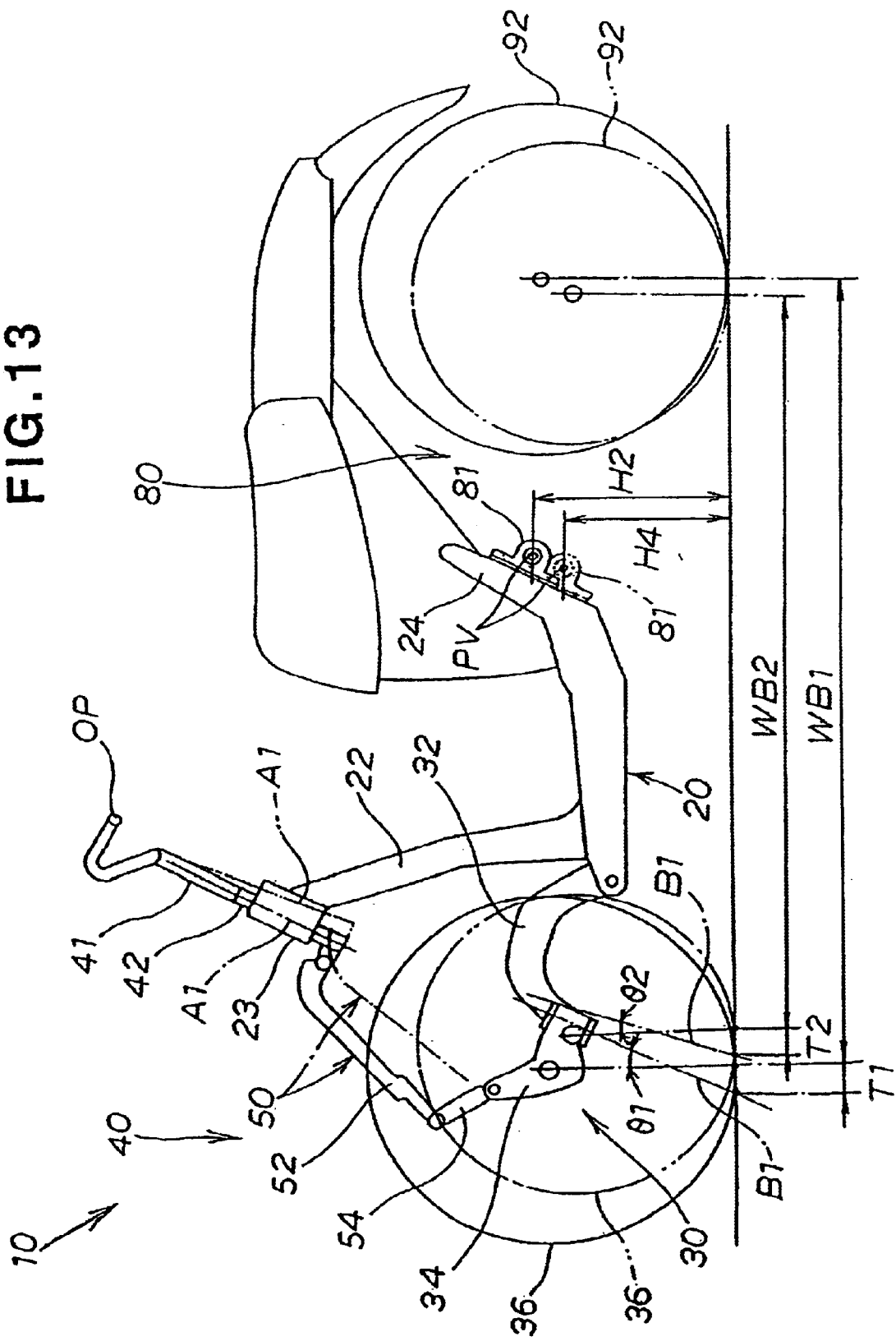
FIG. 13 is a view illustrating how to mount front rear wheels of different diameters in the two-wheeled automotive vehicle shown in FIG. 1.

FIG. 13 is a schematic view of the motorcycle of the first preferred embodiment of the present invention with a view to comparing the following situations (1) and (2).

(1) The motorcycle 10 includes the front wheel 36 of a large size and the rear wheel 92, which are shown by a solid line. The front suspension system 30, the steering system 40 and the rear wheel support unit 80 assume respective positions as shown by solid lines. In these instances, the wheel base between the front wheel 36 and the rear wheel 92 has a value of WB1, a caster angle of θ1 (i.e., a caster angle of the front wheel 36) at the center line B1 of the king pin, a trail T1 of the front wheel 36 and the pivot point PV remaining at the height H2.

(2) The motorcycle 10 includes the front wheel 36 of a small size and the rear wheel 92, which are shown by a phantom line. The front suspension system 30, the steering system 40 and the rear wheel support unit 80 assume respective positions as shown by phantom lines. In these instances, the wheel base between the front wheel 36 and the rear wheel 92 has a value of WB2, a caster angle of θ2 at the center line B1 of the king pin, a trail T2 of the front wheel 36 and the pivot point PV remaining at the height H4.

When the front wheel 36 of the large diameter is replaced with the front wheel 36 of the small diameter, the caster angles θ1, θ2 and the trails T1, T2 may be settled to optimum values with a view to providing an improved driving characteristic, and, in accordance with the caster angles θ1, θ2 and the trails T1, T2, the front suspension system 30 and the steering system 40 may be suitably settled to have an optimum operational relationship. 'For example, in order to settle a manipulating position OP of a handle lever 41 to the same height as that of the front wheel before replacement thereof even in a case where the front wheels 36 of different diameters are replaced, the inclination and the position of the steering shaft 42 may be suitably altered to desired values with respect to the head pipe 23. In addition, when the rear wheel 92 of a large diameter and the rear wheel 92 of a small diameter are replaced, the mounting height of the pivot member 81 may be adjusted.

In summary with respect to motor cycle 10, in accordance with the diameter of the front wheel 36, the center line A1 of the steering shaft 42 may be altered to have an arbitrary position and an inclined angle. Consequently, even in a case where the size of the front wheel 36 is altered, there is no need for changing the position of the head pipe 23 which is integrally formed with the body frame 20. Further, in accordance with the size of the rear wheel 92, the mounting height of the pivot member 81 maybe arbitrarily altered with respect to the body frame 20.

Due to these results, it is possible for the body frame 20 to be commonly used even when the diameter of the front wheel 36 and the diameter of the rear wheel 92 are altered, with a resultant decrease in manufacturing cost of the motorcycle 10.

Further, by suitably setting the caster angles θ1, θ2 and the trails T1, T2, it is possible to commonly use the steering shaft 42 of the steering system 40 and the link mechanism 50. Also, the front suspension system 30 needs only modification of the swing arm 32.

Furthermore, by suitably adjusting the inclination and the angle of the center line A1 of the steering shaft 42 with respect to the head pipe 23 while changing the lengths of the first and second links 52, 54, in accordance with the diameter of the front wheel 36, it is possible to vary the rate of the steering angle of the front wheel 36 relative to the manipulating angle of the steering shaft 42. With the variation in such a rate, the manipulating force of the steering shaft 42 may be varied to an optimum level.

Figure 14:
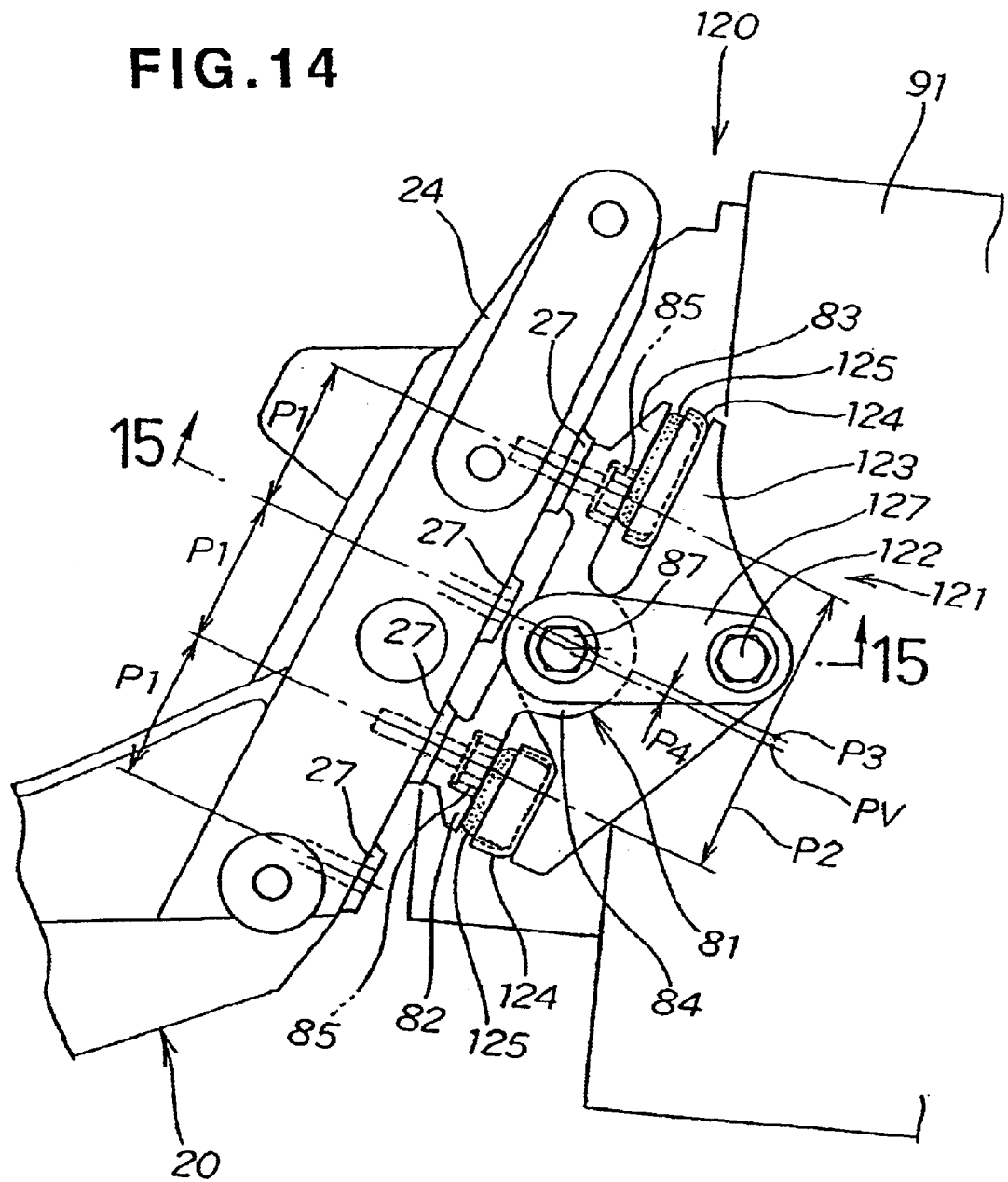
FIG. 14 is a view illustrating a first modification of the rear wheel support unit according to the first embodiment shown in FIG. 11.

FIG. 14 shows a first modified form of the rear wheel support unit of the motorcycle of the first preferred embodiment.

The rear wheel support unit 120 of the first modified form features that the front portion of the power unit 91 is mounted to the pivot member 81 by means of a vibration-proof link mechanism 121 and is swingable upward or downward. Other structural components are the same as the rear wheel support unit 80 of the first preferred embodiment shown in FIGS. 11 and 12 and, therefore, bear the same reference numerals, with a detailed description of the same being omitted.

The vibration-proof link mechanism 121 serves as a mechanism wherein a pivot shaft 122 of the power unit 91 is located rearward of the pivot shaft 87 of the pivot member 81 and the pivot shafts 87, 122 are connected to one another by means of a vibration-proof link 123 such that the power unit 91 is swingably mounted to the pivot shaft 87 by means of the vibration-proof link 123.

In such a structure, upper and lower distal ends of the vibration-proof link 123 are mounted with rubber mount segments 124, 124, to which stopper rubbers 125, 125 made of resilient material are fixedly secured.

The upper and lower stopper rubbers 125, 125 are located so as to lie in abutting contact with the first and second coupling segments 82, 83 of the pivot member 81. Accordingly, the swinging movement of the vibration-proof link 123 is resiliently restricted with the rear surfaces of the first and second coupling segments 82, 83 and the upper and lower stopper rubbers 125, 125. That is, the first and second stopper rubbers 125, 125 provide shock absorbing functions during upward and downward swinging movements and restoring functions to be effected toward a neutral position shown in the drawings.

Figure 15:
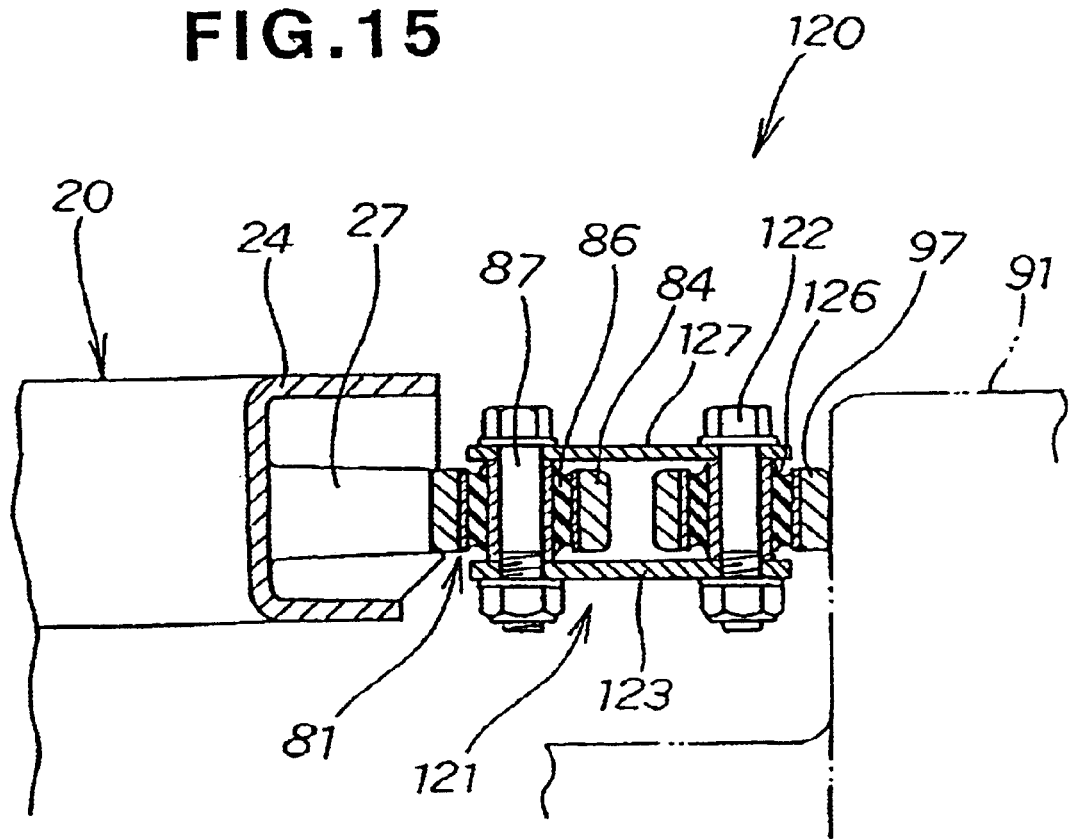
FIG. 15 is a cross-sectional view taken along line 15—15 of FIG. 14.

FIG. 15 shows a structure wherein the pivot shaft 87 is inserted through the pivot segment 84 by means of a rubber bush 86 and, further, the pivot shaft 122 is inserted through the hanger segment 97 of the power unit 91 by means of a rubber bush 126 such that the pivot shafts 87, 122 are interconnected with the vibration-proof link 123. Reference numeral 127 designates an auxiliary link.

Figure 16:
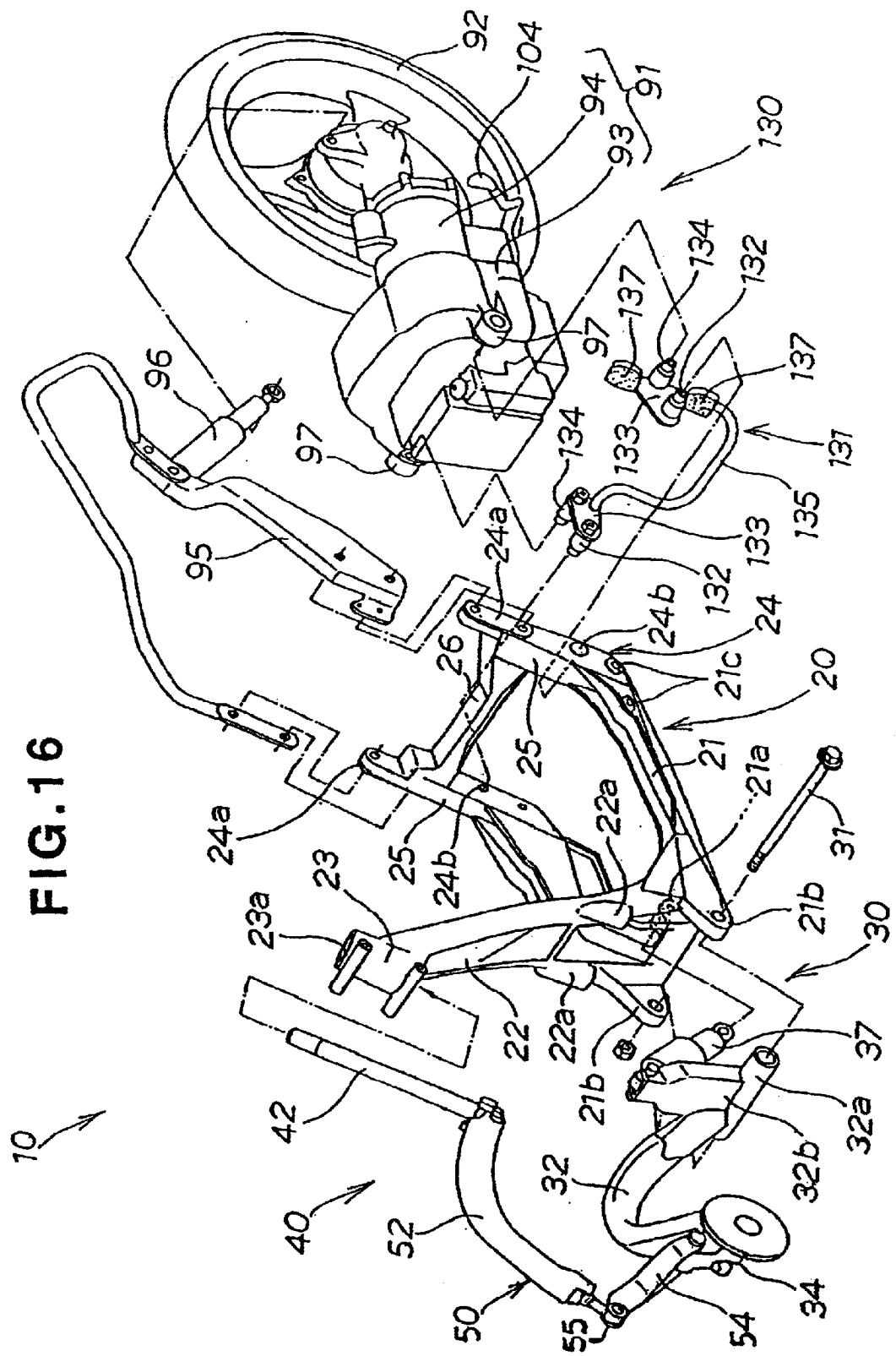
FIG. 16 is an exploded perspective view of a two-wheeled automotive vehicle employing a second modification of the rear wheel support unit.
Figure 17:
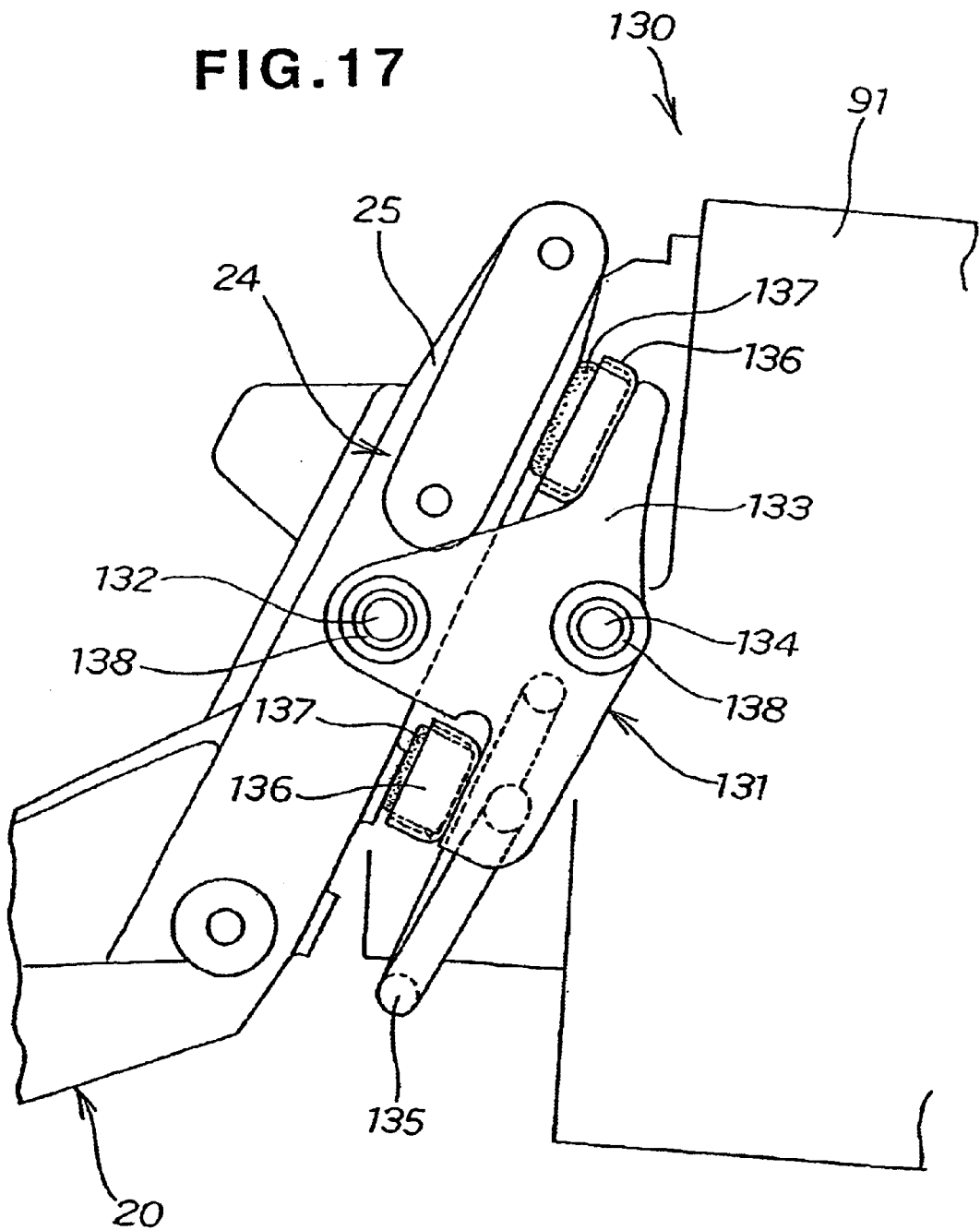
FIG. 17 is an enlarged side view of the second modification of the rear wheel support unit shown in FIG. 16.

FIGS. 16 and 17 show a second modified form of the rear wheel support unit of the first preferred embodiment.

In FIG. 16, the rear wheel support unit 130 of the second modified form features that the front portion of the power unit 91 is mounted to the right and left rear mount segments 24b, 24b of the rear upright section 24 by means of a vibration-proof link mechanism 131 and is swingable upward or downward. In particular, the vibration-proof link mechanism 131 serves as a mechanism wherein right and left vibration-proof links 133a, 133b are swingably mounted to the right and left rear mount segments 24b, 24b by means of first pivot shafts 132, 132, respectively, and the hanger segments 97, 97 of the power unit 91 are swingably mounted to the vibration-proof links 133a, 133b by means of second pivot shafts 134, 134, respectively. Both the right and left vibration-proof links 133a, 133b are interconnected to one another by a coupling bar 135.

FIG. 17 shows a structure wherein the front portion of the power unit 91 is mounted to the sides of the rear upright section 24 by means of the vibration-proof mechanism 131.

Among the right and left vibration-proof links 133a, 133b shown in FIG. 16, upper and lower ends of the left vibration-proof link 133b carry rubber mount segments 136, 136 to which stopper rubbers 137, 137 made of resilient material are mounted. The upper and lower stopper rubbers 137, 137 are placed in abutting contact with a rear surface of an upright portion 25. Accordingly, the swinging movement of the vibration-proof link 133b is resiliently restricted with the rear surface of the upright portion 25 and the associated stopper rubbers 137, 137. That is, the upper and lower stopper rubbers 137, 137 provide shock absorbing functions during upward and downward swinging movement of the vibration-proof link 133b and restoring functions to be effected toward the neutral position shown in the drawings. Reference numerals 138, 138 designate rubber bushes, respectively.

As will be apparent from the foregoing description, the motorcycle 10 of the second modified form allows the body frame 20 of the motorcycle 10 shown in FIGS. 1 to 13 to be commonly used.

Now, a vehicle of a second preferred embodiment is described below with reference to an example of a three-wheeled automotive vehicle (automotive three wheeler) shown in FIGS. 18 to 20.

Figure 18:
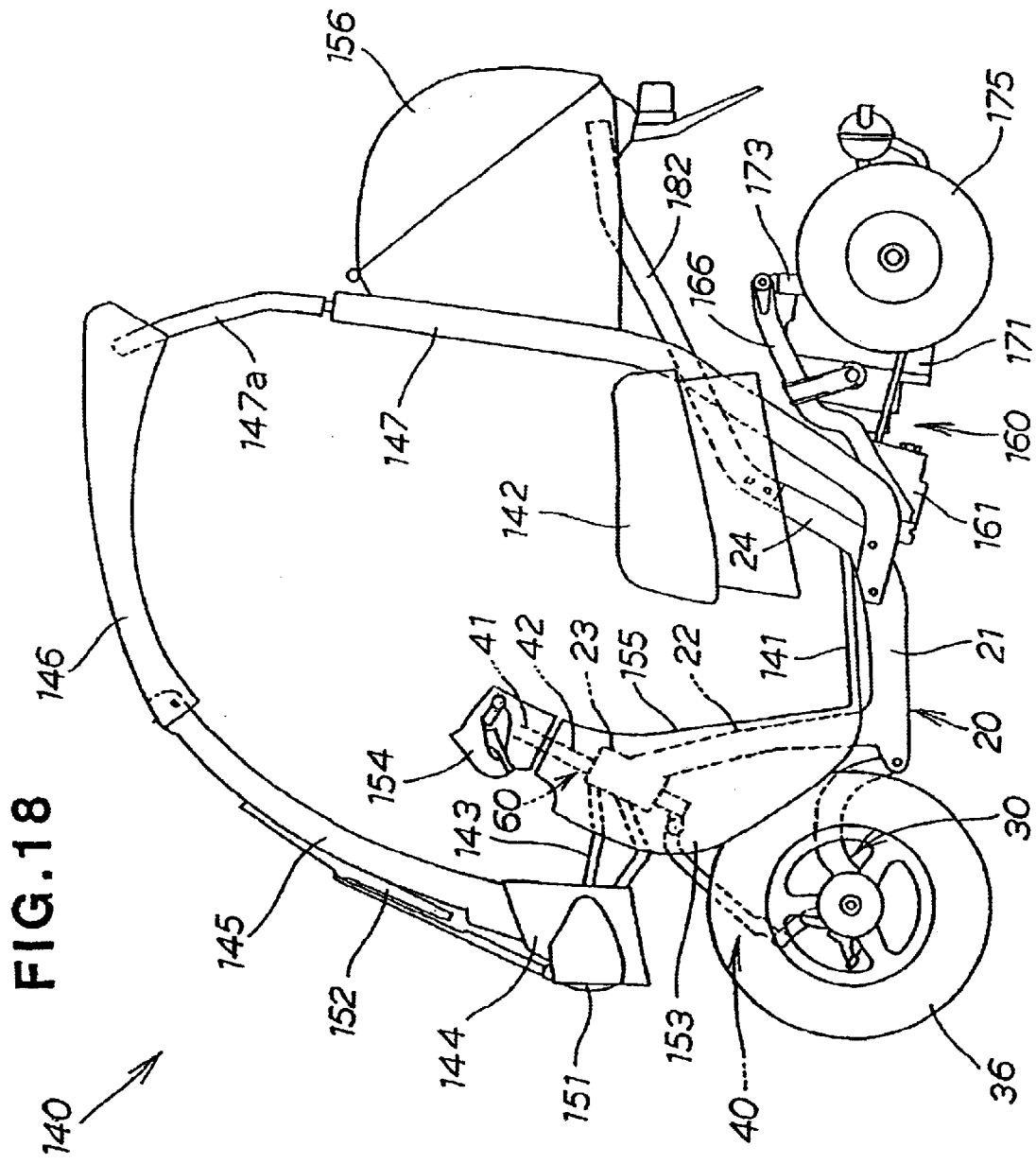
FIG. 18 is a side view illustrating a three-wheeled automotive vehicle according to a second embodiment of the present invention.

The three-wheeled automotive vehicle 140 shown in FIG. 18 is a scooter type tricycle motor vehicle which includes a single front wheel 36 and two rear wheels 175, 175. The three-wheeled automotive vehicle 140 has a structure wherein a front suspension system 30 and a steering system 40 are mounted to a front portion of a body frame 20, a rear wheel support 160 is mounted to a rear portion of the body frame 20, a substantially horizontal, low floor type foot rest (floor step) 141 is mounted to an intermediate and upper portion of the body frame 20 and a seat assembly 142 is mounted to the rear and upper portion of the body frame 20.

The front suspension system 30 and the steering system 40 have the same structures as those of the motorcycle 10 of the first preferred embodiment shown in FIGS. 1 to 13, with the same component parts bearing the same reference numerals and a detailed description of the same being omitted.

The three-wheeled automotive vehicle 140 has a structure wherein a screen garnish 144 is mounted to a front portion of the head pipe 23 by means of a stay 143, a wind screen 145 stands upright from the screen garnish 144, a front distal end of a roof 146 is mounted to an upper distal end of the wind screen 145, a roof support pole, i.e., a pillar 147 stands upright from a rear portion of the body frame 20, and a rear distal end of the roof 146 is mounted to a support segment 147a of the pillar 147. In the drawings, reference numerals 151, 152, 153, 154, 155 and 156 designate a head lamp, a wiper, a front cover, a handle cover, a leg shield which covers the driver's legs, and a receiver box, respectively.

Figure 19:
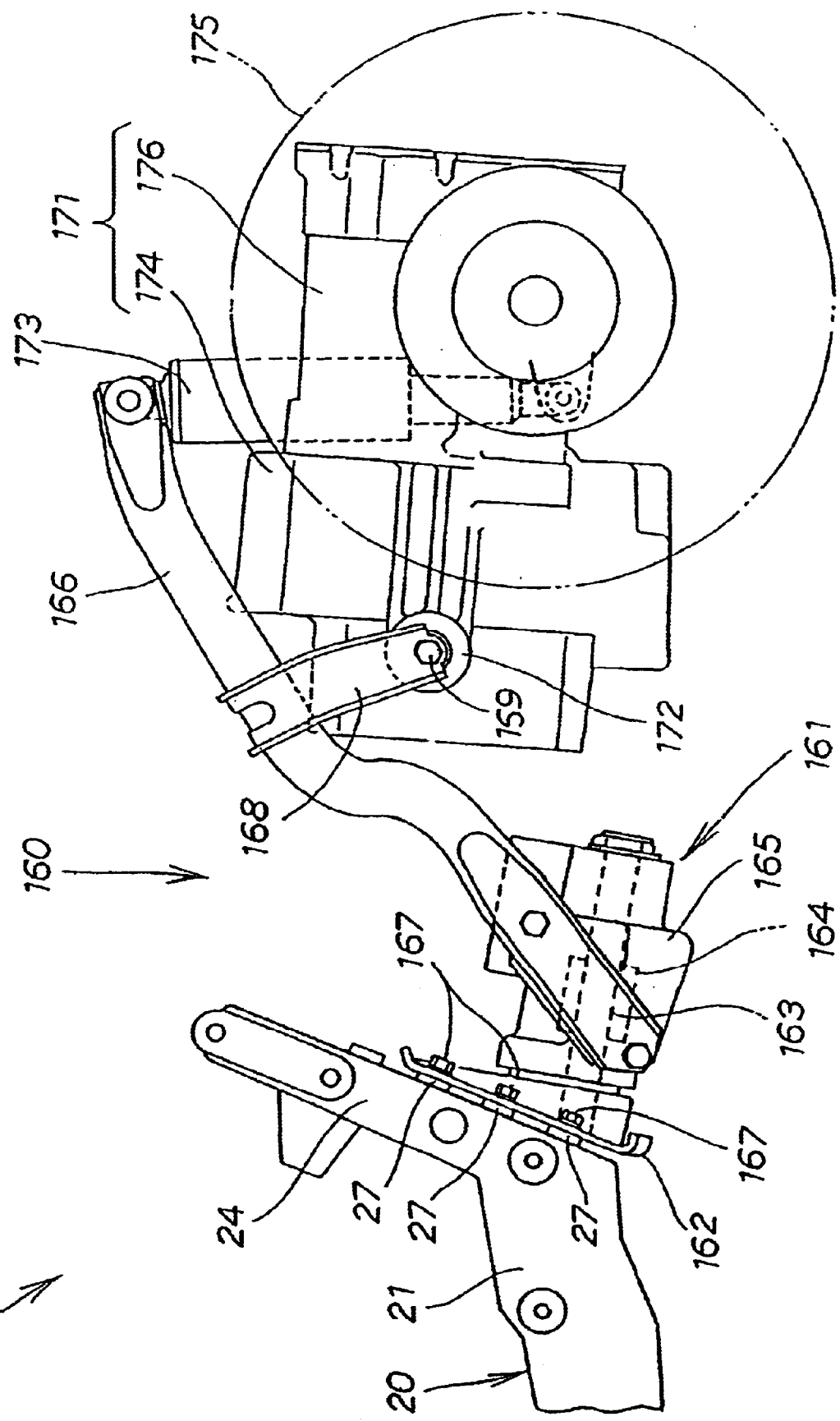
FIG. 19 is an enlarged side view of the rear wheel support unit shown in FIG. 18.

In FIG. 19, a rear wheel support unit 160 features that the body frame 20 has the rear surface formed with four rear mount portions 27 to which a swinging type power unit 171 with a rear wheel is mounted by means of a coupling mechanism 161 in a rolling and swingable relationship. Here, the word "rolling" refers to the movement that the power unit 171 rotates about a center of a coupling shaft 163, which extends in a fore and aft direction of the coupling mechanism 161, relative to the body frame 20.

The coupling mechanism 161 includes a front mounting flange 162, the coupling shaft 163 mounted to the mounting flange 162 and extending in the fore and aft direction of the vehicle, a coupling case 165 rotatably coupled to the coupling shaft 163 by means of a damper mechanism 164, and a hanger 166 fixed to the coupling case 165. The coupling mechanism 161 is detachably mounted to the body frame 20 by fixing the mounting flange 162 to the rear mount portions 27 by means of a plurality of bolts 167.

The damper mechanism 164 has a shock absorbing function during rotating movement of the coupling case 165 relative to the coupling shaft 163 and a restoring function to restore the neutral position, i.e., a so-called damper function.

The hanger 166, which extends rearward and upward from the coupling case 165, has an intermediate position in a lengthwise direction to which a hanger segment 172 of the power unit 171 is swingably mounted by means of a bracket 168 and a pivot shaft 169, and a rear end position to which a rear end of the power unit 171 is suspended by means of a rear damper 173. The power unit 171 unitarily incorporates an engine 174 and a power transmission unit 176 for transmitting power output of the engine 174 to rear wheels 175, 175 and serves as a three-wheeled-automotive-vehicle rear unit, equipped with the right and left rear wheels 175, 175, i.e., a rear unit.

Figure 20:
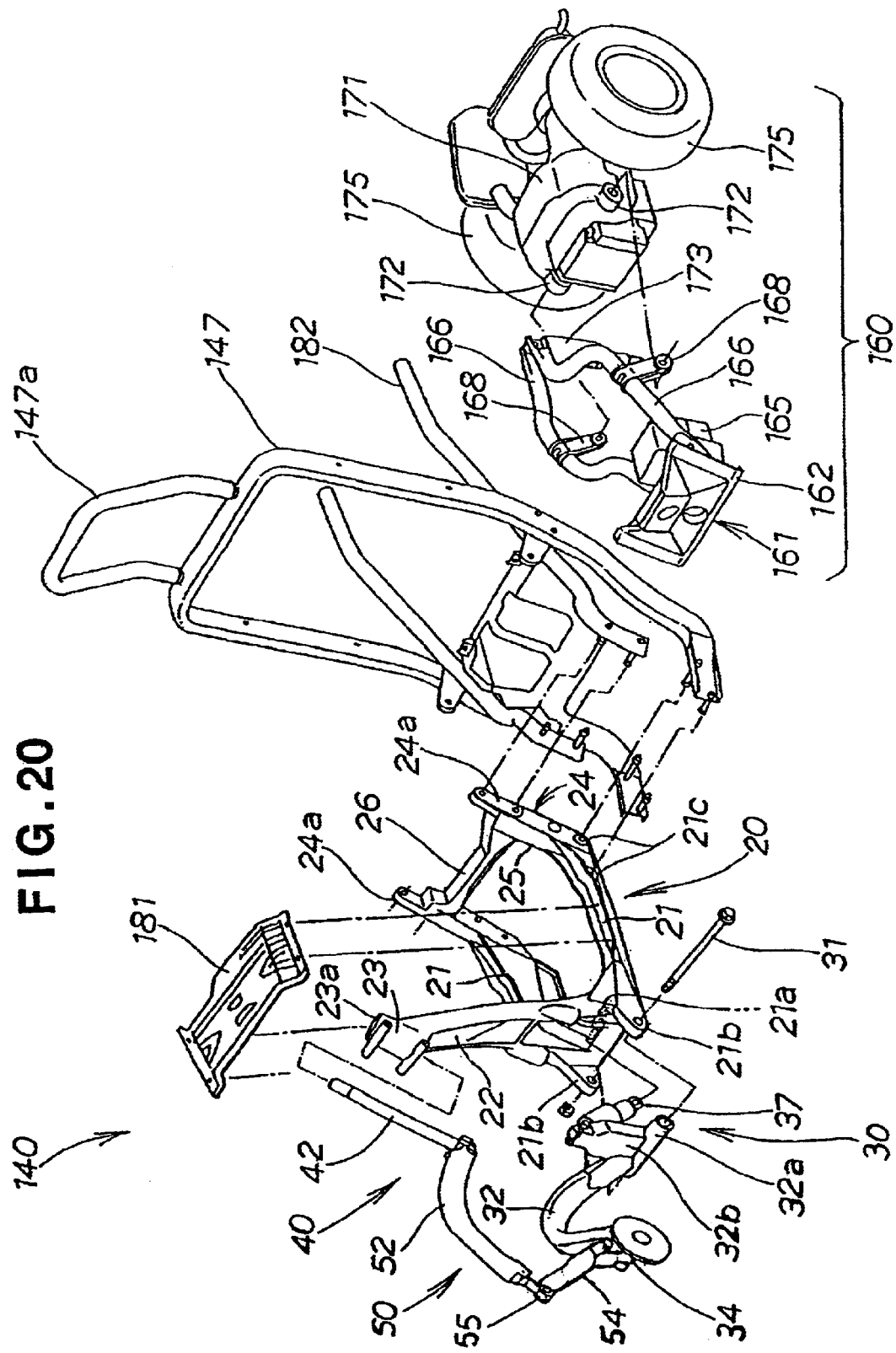
FIG. 20 is an exploded perspective view of the three-wheeled automotive vehicle shown in FIG. 18, with a front wheel and a roof being omitted.

In FIG. 20, the body frame 20 of the three-wheeled automotive vehicle 140 concerns the following features.

(1) The main frame 21 plays a roll to support the foot rest 141 shown in FIG. 18.

(2) Placing an auxiliary plate 181 onto the main frame 21 and fixing the same by bolts increases the rigidity of the body frame 20.

(3) Fixing lower ends of the pillar 147 to right and left pillar mount portions 21c, 21c of the main frame 21 allows the lower ends of the pillar 147 to be detachably mounted to both sides of the body frame 20 in an easy manner. Accordingly, it is possible for various component parts, such as the roof 146 (see FIG. 18), etc., to be mounted to the body frame 20 via the pillar 147.

(4) A rear frame 182 can be fixed to right and left rear frame mount portions 24a, 24a of the rear upright section 24 by bolts.

Upon consideration of an optimum driving characteristic of the three-wheeled automotive vehicle 140, adjusting the adjustment mechanism 60 which has been discussed as the first preferred embodiment with reference to FIGS. 5 to 10 enables the center line A1 of the steering shaft 42 to be settled to an arbitrary position and angle. Consequently, even when modifying the motorcycle 10 of the first preferred embodiment shown in FIG. 1 to the three-wheeled automotive vehicle 140, there is no need for changing the position of the head pipe 23 of the body frame 20. In addition, the power unit 171 can be coupled to the plural rear mount portions 27 formed on the rear surfaces of the body frame 20 by means of the coupling mechanism 161, thereby enabling the body frame 20 of the motorcycle 10 shown in FIGS. 1 to 13 to be commonly used for the three-wheeled automotive vehicle 140.

Now, a vehicle of a third preferred embodiment is described below in detail with reference to a four-wheeled automotive vehicle (automotive four wheeler) as shown in FIGS. 21 to 25.

Figure 21:
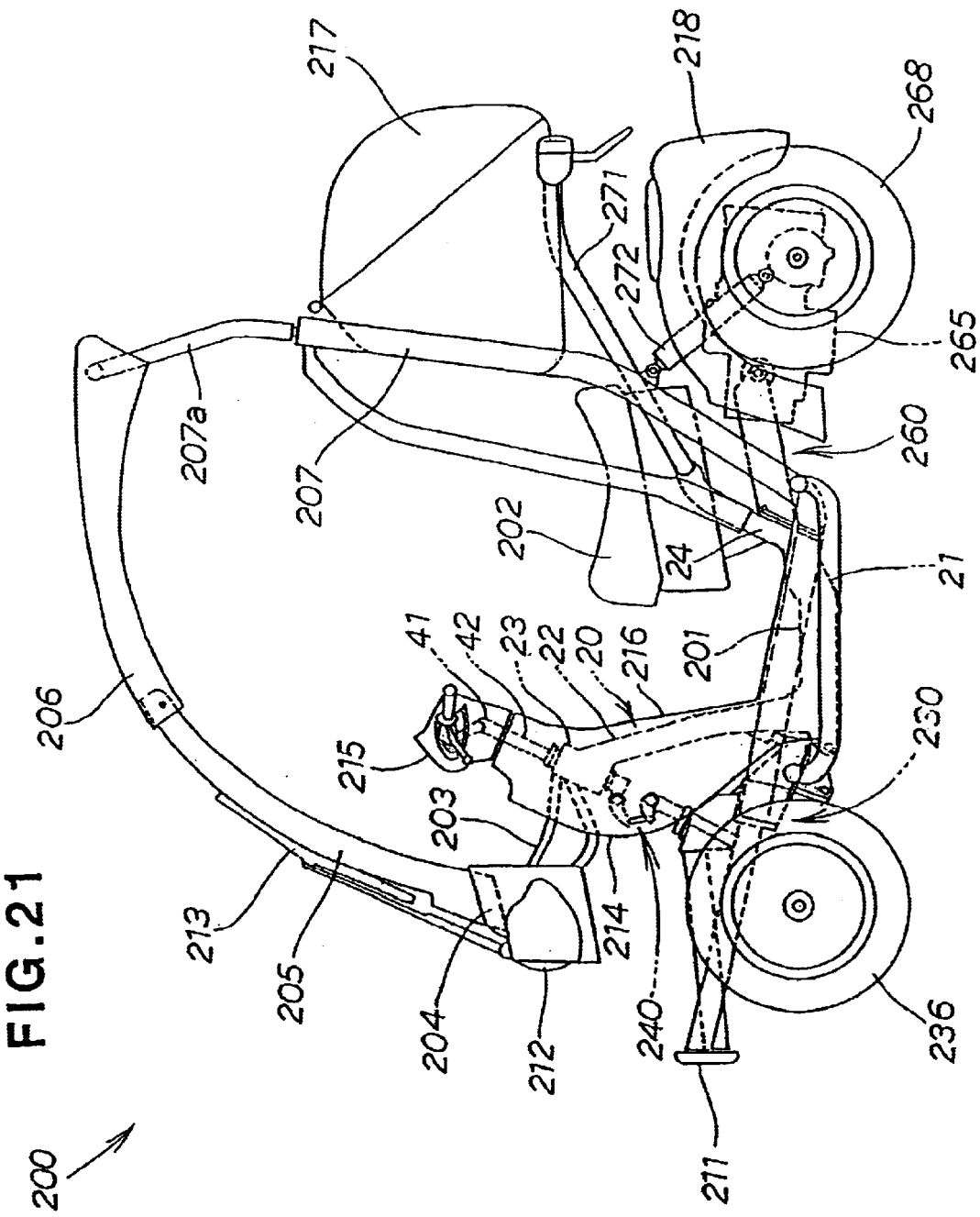
FIG. 21 is a side view illustrating a four-wheeled automotive vehicle according to a third embodiment of the present invention.

In FIG. 21, the four-wheeled automotive vehicle 200 is a scooter type four-wheeled motor vehicle where in a substantially horizontal, is lower floor type foot rest (a floor step) 201 is mounted to a central and upper portion of the body frame 20, a seat 202 is mounted to a rear and upper portion of the body frame 20, a front suspension system 230 and the steering system 240 are mounted to a front portion of the body frame 20, a rear wheel support unit 260 is mounted to the rear portion of the body frame 20, and which includes right and left two front wheels 236 and right and left two rear wheels 268.

The four-wheeled automotive vehicle 200 has a structure wherein a screen garnish 204 is mounted to a front portion of the head pipe 23 by means of a stay 203, a wind screen 205 stands upright from the screen garnish 204, a front distal end of a roof 206 is mounted to an upper distal end of the wind screen 205, a roof support pole, i.e., a pillar 207 stands upright from a rear portion of the body frame 20 and a rear distal end of the roof 206 is mounted to a support segment 207a of the pillar 207. In the drawings, reference numerals 211, 212, 213, 214, 215, 216, 217 and 218 designate a bumper, a head lamp, a wiper, a front cover, a handle cover, a leg shield which covers the driver's legs, a receiver box and a rear cover, respectively.

Figure 22:
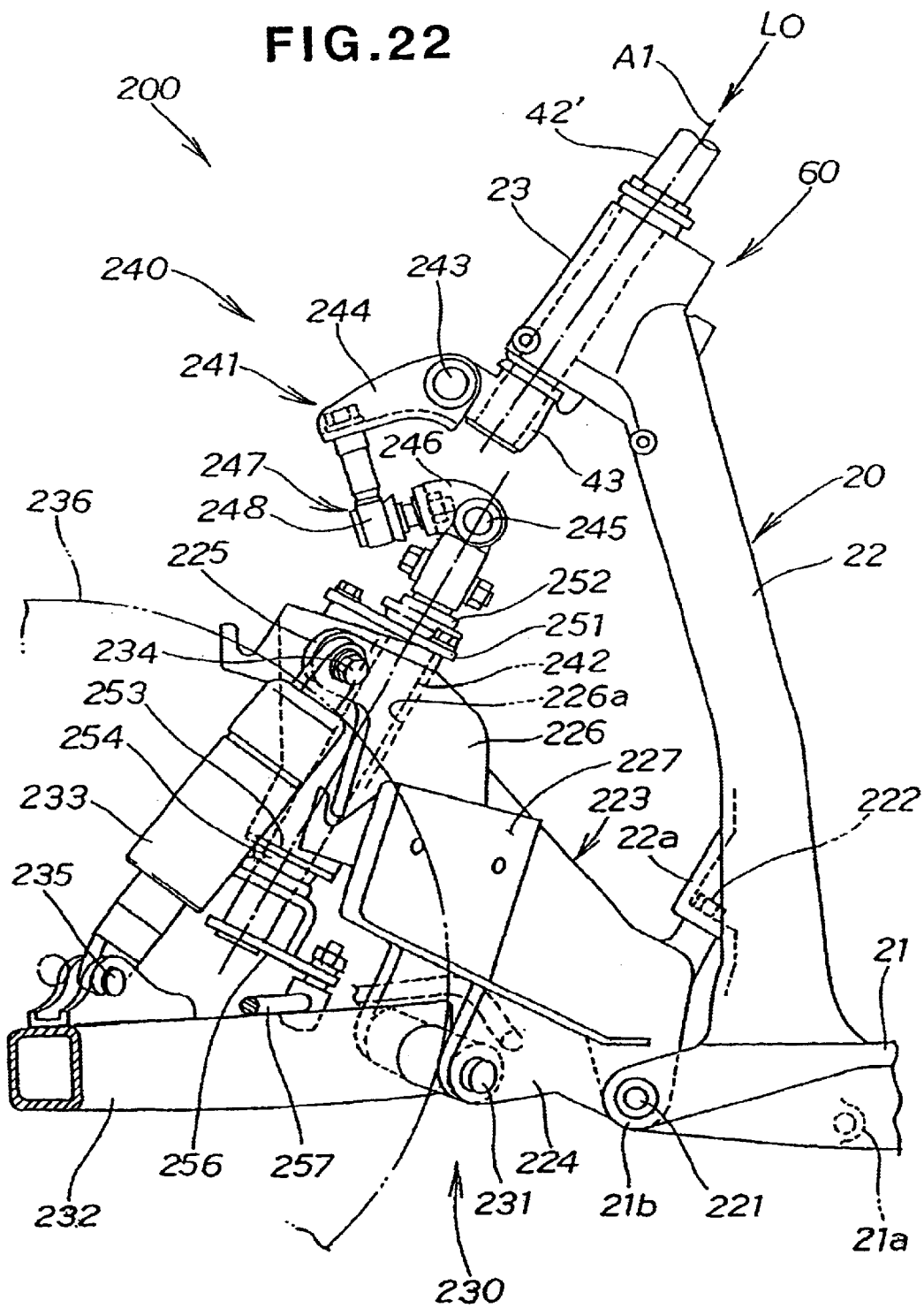
FIG. 22 is an enlarged side view of the front suspension system and the steering system shown in FIG. 21.

FIG. 22 shows a front suspension system 230 and a steering system 240 which are located at a front area of the four-wheeled automotive vehicle 200.

The four-wheeled automotive vehicle 200 is constructed such that a rear portion of a front frame 223 is detachably mounted to front mount segments 21b of the main frame (the center frame portion) 21 and front mount segments 22a of the head pipe post (the front frame section) 22 by means of bolts 221, 222.

The front frame 223 includes arm mount segments 224 for swingably mounting a swing arm 232, a damper coupling segment 225 for coupling upper ends of front dampers 233 by which the swing arm 232 is suspended, a steering support segment 226 for rotatably supporting a second steering shaft 242, and a bumper mount segment 227 for mounting the bumper 211 (see FIG. 21).

Figure 24:
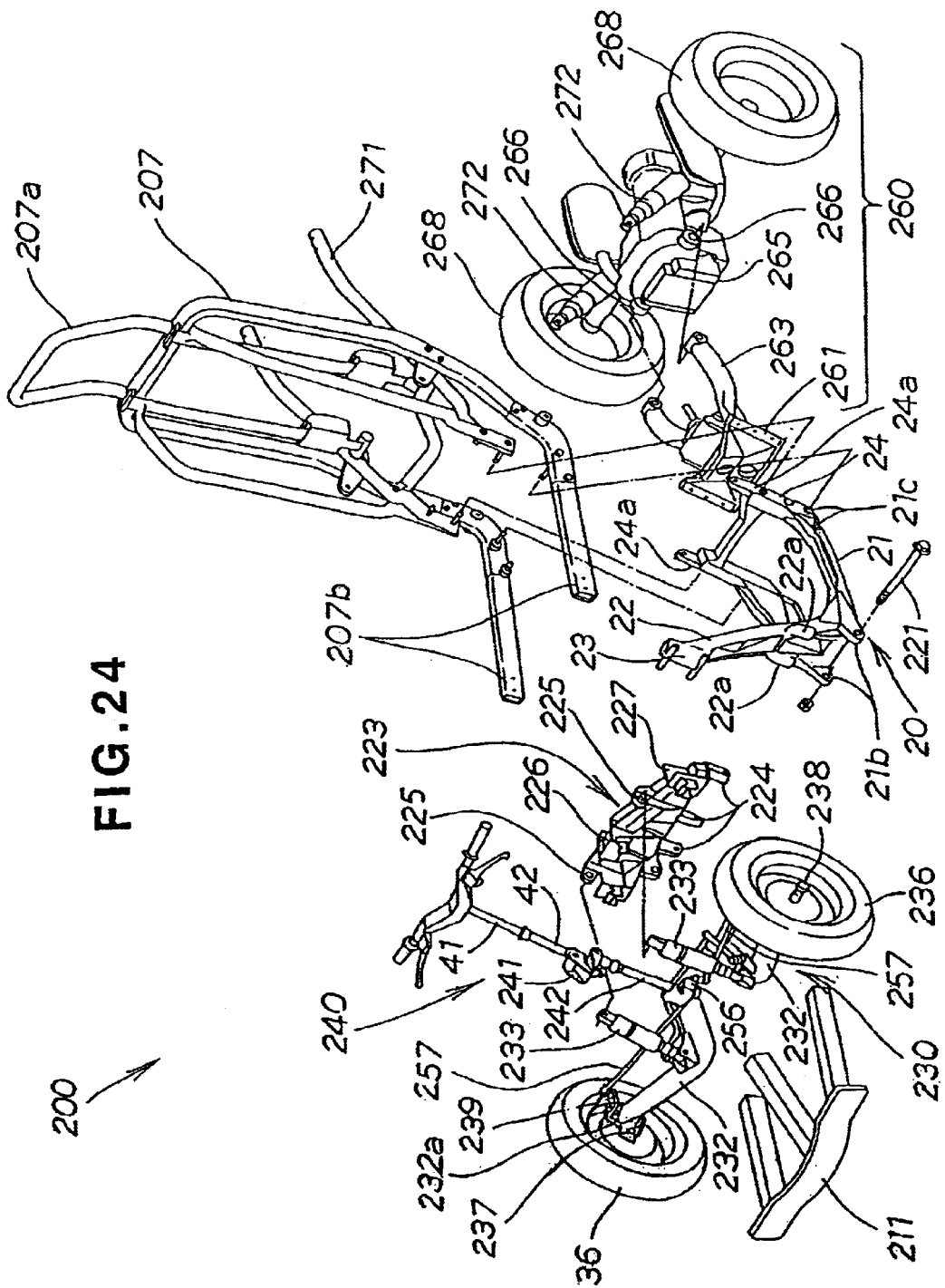
FIG. 24 is an exploded perspective view illustrating the four-wheeled automotive vehicle shown in FIG. 21, with the roof omitted.

The front suspension system 230 includes the front frame 223, the swing arm 232 swingably mounted to the arm mount segments 224 of the front frame 223 by means of a pivot shaft 231, and the front damper 233 having an upper end coupled to the damper coupling segments 225 of the front frame 223 by damper coupling bolts and a lower end coupled to the swing arm by damper coupling bolts for suspending the swing arm 232. The swing arm 232 supports right and left two front wheels 236 as shown in FIG. 24.

The steering system 240 has the following features (1) and (2).

(1) A first steering shaft 42' is rotatably supported by the head pipe 23, and the second steering shaft 242, which is different from the first steering shaft 42', is connected to the connecting member 43 formed at the lower distal end of the first steering shaft 42' by means of a link mechanism 241.

(2) The head pipe 23 has a structure which includes the adjustment mechanism 60 which changes the center line A1 of the steering shaft 42' relative to the center line of the head pipe 23.

Since the first steering shaft 42', the coupling member 43 and the adjustment mechanism 60 have the same structures as the steering shaft 42, the connecting member 43 and the adjustment mechanism 60 which have been discussed with reference to the first preferred embodiment shown in FIGS. 5 and 7 to 10, a detailed description of these component parts is herein omitted.

The link mechanism 241 is composed of a crooked link mechanism which is foldable in an up and down direction and which includes a first link 244, a second link 246 and a coupling member 247 for coupling these links. One distal end of the first link 244 is coupled to the connecting member 43 of the first steering shaft 42' by means of a first connecting pin 243 to be swingable in an up and down direction. One distal end of the second link 246 is coupled to an upper end of the second steering shaft 242 by means of a second connecting pin 245 to be swingable in an up and down direction. Other distal ends of the first and second links 244, 246 are coupled to the connecting member 247 by means of a universal joint coupling 248. The connecting member 247 is enabled to be swingable vertically by means of the universal joint coupling 248. The universal joint coupling 248 is made of, for example, a ball joint.

In the steering system 240, the second steering shaft 242 is located such that the center of the second steering shaft 242 is offset rearward from the center of the first steering shaft 42'. That is, when viewing from the center line LO, the first steering shaft 41' remains in an intermediate position between the second steering shaft 242 and the universal joint coupling 248.

The steering support segment 226 has a through-bore 226a extending in an up and down direction to receive the second steering shaft 242. The through-bore 226a has a diameter of a relatively large size to allow the second steering shaft 242 to be displaced in a radial direction.

The front frame 223 has a top plate 251 and a bottom plate 253 which are detachably mounted to upper and bottom walls of the steering support segment 226, respectively. The top plate 251 has a first bearing 252. The bottom plate 253 has a second bearing 254. The second steering shaft 242 is supported with these first and second bearings 252, 254. A lower distal end of the second steering shaft 242 is connected to a tie rod 257 via a rod connecting segment 256.

Figure 23:
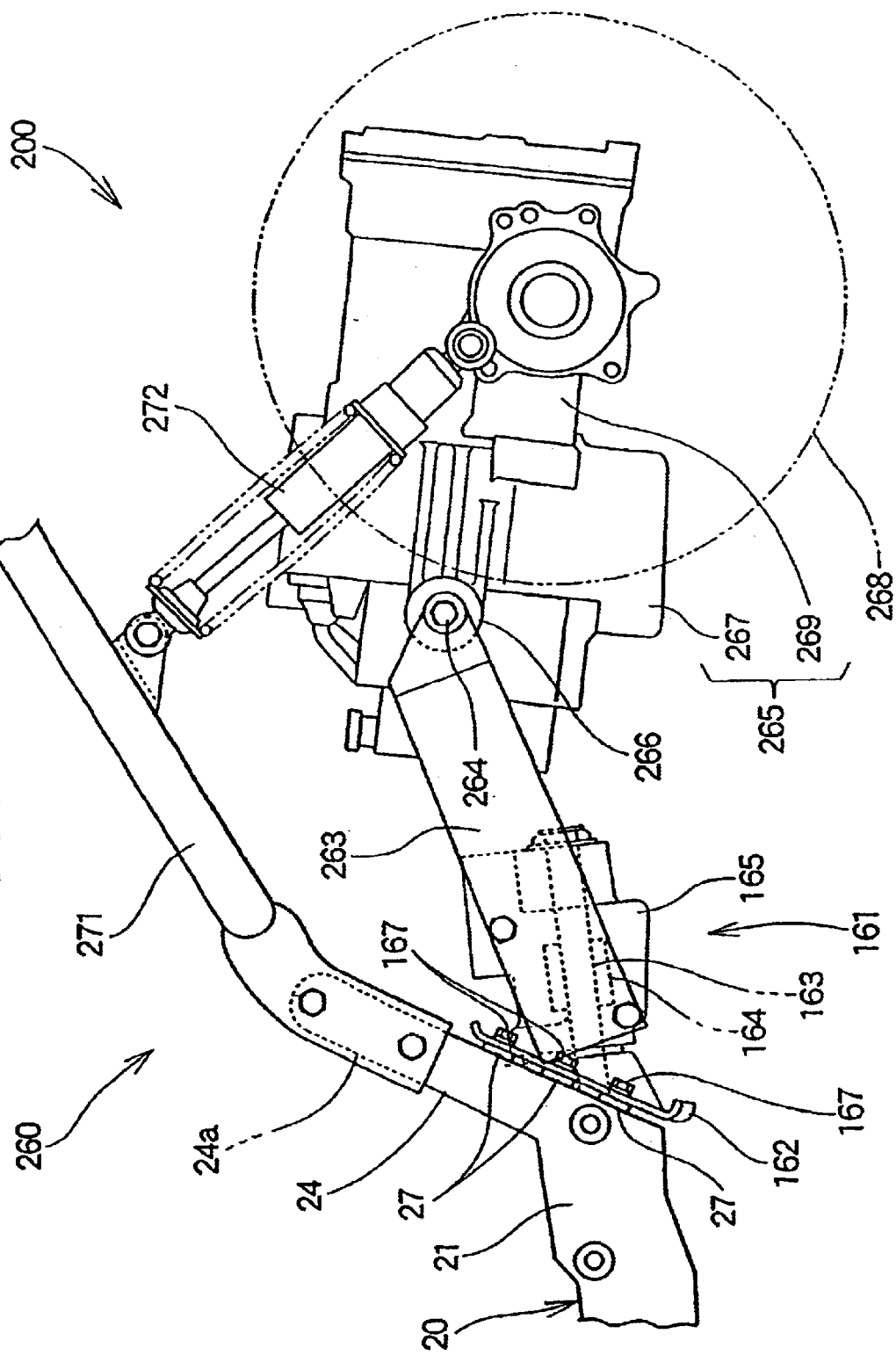
FIG. 23 is an enlarged side view of the rear wheel support unit shown in FIG. 21.

The rear wheel support unit 260 of the four-wheeled automotive vehicle is shown in FIG. 23. The rear-wheel support unit 260 has a structure wherein a swing type power unit 265 with rear wheels is coupled to the plural rear mount portions 27 formed at the rear walls of the body frame 20, via the coupling mechanism 161 to have a rolling effect and to be swingable in an upward or downward direction. Here, the word "rolling" refers to the movement that the power unit 265 rotates about the shaft, extending in a fore and aft direction of the coupling mechanism 161, relative to the body frame 20. The coupling mechanism 161 of the present preferred embodiment has the same structure as the coupling mechanism 161 forming part of the rear wheel support unit 160 of the motor-tricycle 140 of the second preferred embodiment and, therefore, bears the same reference numerals so that a detailed description of the same is omitted.

The rear wheel support unit 260 has a structure wherein a base portion of a hanger 263 is mounted to the coupling case 165 of the coupling mechanism 161 and the hanger 263 is arranged to extend rearward to have rear distal ends to which hanger segments 266 of the power unit 26S is mounted by means of pivot shafts 264 and is swingable in an upward or downward direction. The rear wheel support unit 260 may be constructed so as to couple at least the power unit 265 to the aforementioned rear mount portions 27 by means of the coupling mechanism 161 in a vertically swingable relation.

A rear frame 271 is mounted to a rear end of the body frame 20 and extends rearward. The power unit 265 is suspended from the rear frame 271 by means of a rear damper 272. The power unit comprises a rear unit which includes an engine 267, and a power transmission mechanism 269 for transmitting power output of the engine 267 to the rear wheels 268, which are incorporated in a unitary fashion.

FIG. 24 is an exploded view of the four-wheeled automotive vehicle according to the present invention.

The body frame 20 of the four-wheeled automotive vehicle 200 has the following features.

(1) The main frame 21 plays a role to support the foot rest 201 (see FIG. 21).

(2) Fixing lower ends of the pillar 207 to right and left pillar mount portions 21c, 21c of the main frame 21 allows the lower ends of the pillar 207 to be detachably mounted to both sides of the body frame 20 in an easy manner. Accordingly, it is possible for various component parts, such as the roof 206 (see FIG. 21), etc., to be mounted to the body frame 20 via the pillar 207.

(3) Extending right and left pillar extensions 207b, 207b forward from lower distal ends of the pillar 207 allows front distal is ends of the pillar extensions 207b, 207b to be detachably mounted to the pillar mount segment 227 of the front frame 223. The pillar extensions 207b, 207b enable the body frame 20 to be reinforced.

(4) The rear frame 271 is enabled to be fixed to the rear frame mount segments 24a, 24a of the rear upright section 24.

The front suspension system 230 is constructed such that a wheel shaft holder block 237 is mounted to a distal end of a swing arm 232 by means of a king pin 232a to be pivotable in a clockwise or counterclockwise direction and a front wheel 236 is rotatably mounted to a wheel shaft holder block 237 by means of a wheel shaft 238.

The steering system 240 is constructed such that right and left tie rods 257, 257 are connected to one another by means of a rod connecting member 256 of the second steering shaft 242 and a knuckle 239 of a wheel shaft holder block 237 is coupled to a distal end of a tie rod 257.

From the foregoing description, the four-wheeled automotive vehicle 200 is summarized as follows.

Upon consideration of an optimum driving characteristic of the four-wheeled automotive vehicle 200, adjusting the adjustment mechanism 60 enables the center line A1 of the steering shaft 42 to be settled to an arbitrary position and angle. Consequently, even when modifying the motorcycle 10 of the first preferred embodiment shown in FIG. 1 to the four-wheeled automotive vehicle 200, there is no need for changing the position of the head pipe 23 of the body frame 20. In addition, the power unit 265 can be coupled to the plural rear mount portions 27 formed on the rear is surfaces of the body frame 20 by means of the coupling mechanism 261. Accordingly, it is possible for the body frame 20 of the motorcycle 10 shown in FIGS. 1 to 13 to be commonly used for the four-wheeled automotive vehicle 200.

Further, the four-wheeled automotive vehicle 200 is constructed such that the front frame 223 is detachably mounted to the main frame 21 and the head pipe post 22 to support the steering shaft 242 while, in addition thereto, the swing arms 232, 232, which support the right and left two front wheels 236, 236, are mounted to the front frame 223 and the swing arms 232, 232 are suspended by means of the front dampers 233, 233. Accordingly, while maintaining a commonality of the body frame 20, it is possible for the front suspension system 230 and the steering system 240 of the four-wheeled automotive vehicle 200 to be readily mounted to the front portion of the body frame 20.

Figure 25:
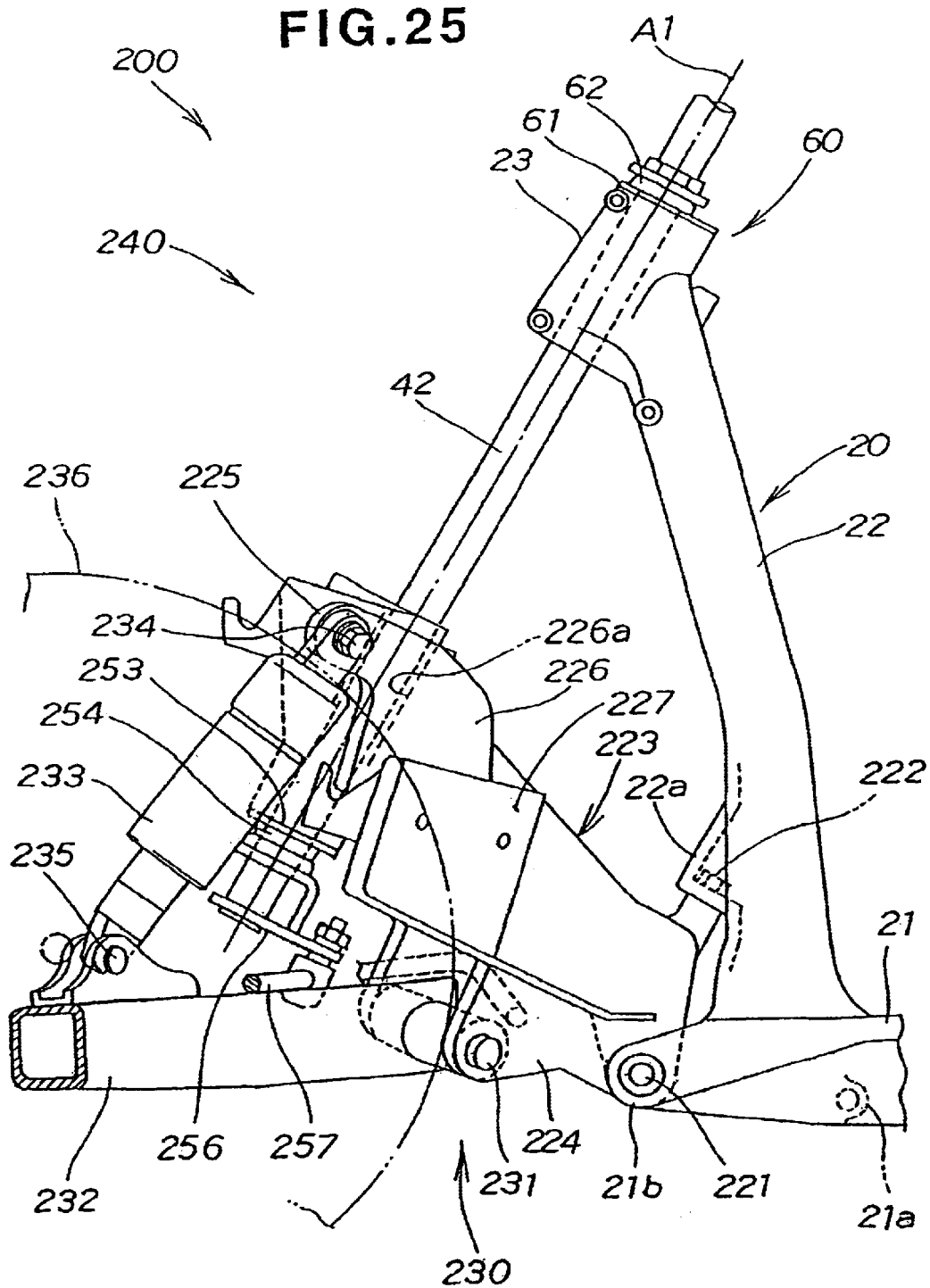
FIG. 25 illustrates an example alteration for the front suspension system and the steering system shown in FIG. 22 wherein a single steering shaft is used.

FIG. 25 is a view for illustrating modifications of the front suspension system and the steering system of the four-wheeled automotive vehicle according to a third preferred embodiment.

The front suspension system 230 and the steering system 240 of the modified forms feature that the link mechanism 241 and the steering shaft 242 as shown in FIG. 22 are dispensed with and, by extending the first steering shaft 42 downward, the first steering shaft 42 serves for the second steering shaft 242, too. Other structures are the same as the four-wheeled automotive vehicle 200 shown in FIGS. 21 to 24 and, therefore, bear the same reference numerals so that a redundant description is omitted.

In particular, a long steering shaft 42 is rotatably mounted to the head pipe 23 and the steering mount segment 226 and the lower distal end of the steering shaft 42 is connected to the tie rod 257 via the rod connecting member 256.

In such a four-wheeled automotive vehicle 200, the head pipe 23 and the front frame 223 include the adjustment mechanism 60. The adjustment mechanism 60 has a structure wherein the steering shaft 42 is supported only with the first bearing 62 of the top plate 61 fixed to the top wall of the head pipe 23, and the second bearing 254 of the bottom plate 253 fixed to the bottom wall of the steering mount segment 226.

As shown in FIGS. 7 to 10, replacement of the plurality of top plates 61 and the plurality of bottom plates 253, which have the through-bores formed in different positions for receiving the steering shaft 42, allows the center line A1 of the steering shaft 42 to be displaced in an arbitrary position or at an arbitrary angle relative to the center line of the head pipe 23.

From the foregoing description, the four-wheeled automotive vehicle 200 of the modified form is summarized below.

Upon consideration of an optimum driving characteristic of the four-wheeled automotive vehicle 200, adjusting the adjustment mechanism 60 enables the center line A1 of the steering shaft 42 to be settled to an arbitrary position and angle. Consequently, even when modifying the motorcycle 10 of the first preferred embodiment shown in FIG. 1 to the four-wheeled automotive vehicle 200, there is no need for changing the position of the head pipe 23 of the body frame 20. In addition, the power unit 265 can be coupled to the plural rear mount portions 27 formed on the rear surfaces of the body frame 20 by means of the mounting flange 261. Accordingly, it is possible for the body frame 20 of the motorcycle 10 shown in FIGS. 1 to 13 to be commonly used for the four-wheeled automotive vehicle 200 of the modified form.

Further, the four-wheeled automotive vehicle 200 of the modified form is constructed such that, like the four-wheeled automotive vehicle 200 shown in FIGS. 21 to 24, the steering shaft 42 is supported with the front frame 223 and further, the swing arm 232 is mounted to the front frame 223 to which the upper distal end of the front damper 233 is coupled. Accordingly, while maintaining a commonality of the body frame 20, it is possible for the front suspension system 230 and the steering system 240 of the four-wheeled automotive vehicle 200 to be readily mounted to the front portion of the body frame 20.

Figure 26:
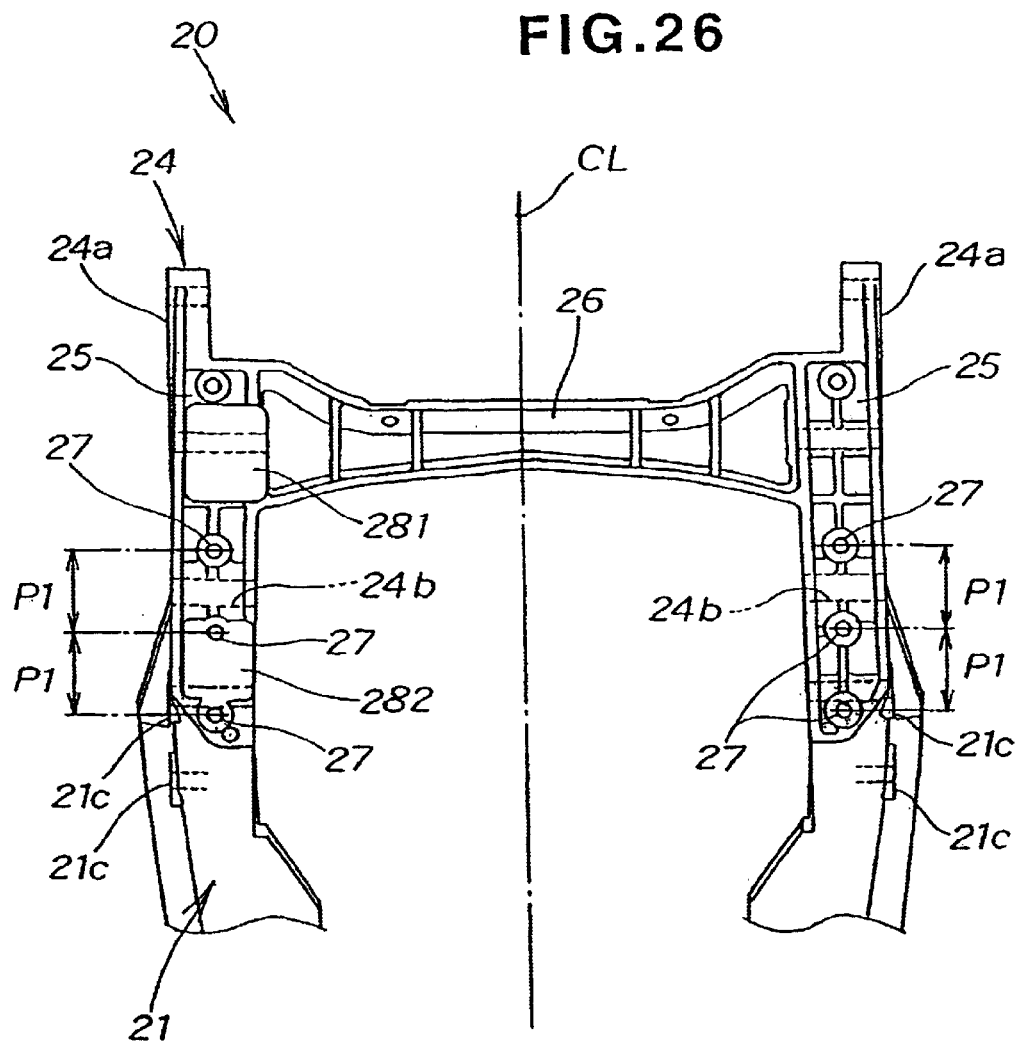
FIG. 26 illustrates a modified form of the body frame shown in FIG. 3.

FIG. 26 is a view for illustrating a modified form of the body frame and corresponds to FIG. 3.

The body frame 20 of the modified form features the provision of (1) three pieces of vertically arranged rear mount portions 27, and (2) flat seat rests 281, 282 formed on the left upright segment 25. Other structures are the same with the body frame 20 shown in FIGS. 2 and 3 and bear the same reference numerals to omit a detail description.

In summary of the foregoing description, when commonly using the body frame 20 of one kind in the motorcycle 10, the three-wheel vehicle 140 and the four-wheel vehicle 200, it is possible for the center line A1 of the steering shaft 42 to be settled to an arbitrary position and angle by adjusting the adjustment mechanism 60. Also, it is possible for the body frame 20 to be selectively mounted with the rear units of plural kinds, such as the rear units 91, 171, 200 of the motorcycle, the three-wheel vehicle and the four-wheel vehicle, respectively. Consequently, among the motorcycle 10, the three-wheel vehicle 140 and the four-wheel vehicle 200, even when there is a difference in structure and dimension (various parameters) in the front wheels 36, 236 and the rear wheels 175, 268, it is possible for the body frame 20 to be commonly used, resulting in a decrease in a production cost of the body frame 20.

Furthermore, an optimum two-wheeled-automotive-vehicle rear unit 91, an optimum three-wheeled-automotive-vehicle rear unit 171 and an optimum four-wheeled-automotive-vehicle rear unit 265 can be suitably selected for the motorcycle 10, the three-wheel vehicle 140 and the four-wheel vehicle 200, respectively, and the two-wheeled-automotive-vehicle rear unit 91, the three-wheeled-automotive-vehicle rear unit 171 and the four-wheeled-automotive-vehicle rear unit 265 can be selectively mounted to the plural rear mount portions 27 of the body frame 20. Accordingly, while maintaining the commonality of the body frame 20 in the two-wheeled automotive vehicle 10, the three-wheeled automotive vehicle 140 and the four-wheeled automotive vehicle 200, it is possible for the body frame 20 to be selectively and readily mounted with the two-wheeled-automotive-vehicle rear unit 91, the three-wheeled-automotive-vehicle rear unit 171 and the four-wheeled-automotive-vehicle rear unit 265.

In the illustrated embodiments discussed above, further, the universal joint couplings 56, 248 may comprise isochronous joint couplings which provide interconnections between the first links 52, 244 and the second links 54, 246, or may be composed of ball joints, universal joints or equivalents thereof.

Further, the outer race 63 of the first bearing 62 may be unitarily formed with the top plate 61, and the outer race 73 of the second bearing may be formed with the bottom plate 71 in a unitary fashion.

Further still, the two-wheeled-automotive-vehicle rear unit 91, the three-wheeled-automotive-vehicle rear unit 171 and the four-wheeled-automotive-vehicle rear unit 265, which serve as the rear units, are not intended to be limited to the swinging type power unit equipped with the rear wheels, but may be composed of a swing arm equipped with the rear wheels.

In addition, the pillars 147, 207 are not limited to the roof support post and may be utilized for various uses such as, for example, posts for mounting a rain shelter member which conceals peripheries of the seats of the three-wheeled automotive vehicle 140 and the four-wheeled automotive vehicle 200.

INDUSTRIAL APPLICABILITY

By using the body frame common to vehicles of different models, the manufacturing cost of the body frame can be decreased, with a resultant useful value in the production of two-, three- and four-wheeled automotive vehicles.

What is claimed is:

1. A vehicle comprising:

a body frame having a center frame section for supporting a foot rest, a rear frame section rising upright from a rear portion of said center frame section, and a front frame section rising upright from a front portion of said center frame section;

a head pipe formed on said front frame section; and a steering shaft rotatably mounted to said head pipe for steering at least one front wheel, said head pipe having an adjustment mechanism for adjusting a position and an angle of a center line of said steering shaft relative to a center line of said head pipe, said rear frame section having a plurality of rear mount portions for selectively mounting a swingable rear unit.

2. The vehicle of claim 1, wherein said rear units comprise a rear unit for a two-wheeled automotive vehicle having at least one rear wheel, a rear unit for a three-wheeled automotive vehicle having a pair of right and left rear wheels, and a rear unit for a four-wheeled automotive vehicle having a pair of right and left rear wheels, and wherein said rear mount portions are disposed on a rear wall of said rear frame section in such a manner as to allow said two-wheeled-automotive-vehicle rear unit to be mounted thereto vertically swingably by means of a pivot member, to allow said three-wheeled-automotive-vehicle rear unit to be coupled thereto rollingly and vertically swingably by means of a coupling mechanism, and to allow said four-wheeled-automotive-vehicle rear unit to be coupled to said rear mount portions at least vertically swingably by means of the coupling mechanism, for thereby permitting said two-wheeled-automotive-vehicle rear unit, said three-wheeled-automotive-vehicle rear unit, and said four-wheeled-automotive-vehicle rear unit to be selectively mounted to said rear mount portions.

3. The vehicle of claims 1 or 2, wherein side portions of said body frame include pillar mount portions to which lower portions of a pillar, which serve as a roof supporting post, are detachably mounted.

4. The vehicle of claim 2, wherein said vehicle comprises a four-wheeled automotive vehicle having a pair of right and left rear wheels, wherein said center frame section and said front frame section have front portions formed with front mount segments to which a front frame is detachably mounted, and wherein said front frame includes arm mount segments for mounting swing arms, which support said pair of right and left front wheels, to be swingable vertically, damper coupling segments for coupling upper distal ends of front dampers by which said swing arms are suspended, and a steering mount segment for rotatably supporting said steering shaft.

* * * * *